US012691900B2

(12) United States Patent
Mori

(10) Patent No.: US 12,691,900 B2
(45) Date of Patent: Jul. 28, 2026

(54) REMOTE SUPPORT DEVICE, REMOTE SUPPORT METHOD, AND STORAGE MEDIUM

(71) Applicant: DENSO CORPORATION, Kariya City (JP)

(72) Inventor: Takuya Mori, Kariya City (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/990,411

(22) Filed: Dec. 20, 2024

(65) Prior Publication Data

US 2025/0126229 A1 Apr. 17, 2025

Related U.S. Application Data

(63) Continuation of application No. PCT/JP2023/020885, filed on Jun. 5, 2023.

(30) Foreign Application Priority Data

Jun. 22, 2022 (JP) ................................. 2022-100595
Jan. 17, 2023 (JP) ................................. 2023-005386

(51) Int. Cl.
*B60W 60/00* (2020.01)
*G06V 20/58* (2022.01)

(52) U.S. Cl.
CPC ........... *B60W 60/001* (2020.02); *G06V 20/58* (2022.01); *B60W 2420/403* (2013.01); *B60W 2556/45* (2020.02); *B60W 2756/10* (2020.02)

(58) Field of Classification Search
None
See application file for complete search history.

(56) References Cited

U.S. PATENT DOCUMENTS

| | | | | |
|---|---|---|---|---|
| 5,130,794 A | * | 7/1992 | Ritchey .................. | H04N 13/38 |
| | | | | 348/E13.052 |
| 10,897,600 B1 | * | 1/2021 | Dabral ...................... | G06T 7/70 |
| 2004/0032493 A1 | * | 2/2004 | Franke .................... | B60R 1/008 |
| | | | | 348/148 |
| 2017/0259820 A1 | * | 9/2017 | Takahashi .............. | G06V 20/58 |

(Continued)

FOREIGN PATENT DOCUMENTS

| | | | | | |
|---|---|---|---|---|---|
| JP | 2020119380 A | * | 8/2020 | .............. | G08G 1/01 |
| JP | 2020161039 A | * | 10/2020 | | |
| JP | 2020177292 A | * | 10/2020 | ......... | G05B 19/0423 |

*Primary Examiner* — Daniel L Greene
(74) *Attorney, Agent, or Firm* — Precision Patents, P.C.

(57) ABSTRACT

A remote support device includes a front image transmission unit that, when remote support at a support point is requested from an autonomous driving vehicle, transmits a front image including at least an area in front of the vehicle captured by the vehicle to a remote control device that performs remote control for the vehicle; a reception unit that receives an operation signal corresponding to the remote control at the support point from the remote control device; an operation signal transmission unit that transmits the received operation signal to the vehicle; and a rear image transmission unit that, after the vehicle passes through a changing point set so as to change display on the remote control device based on the support point, transmits a rear image that is captured so as to include at least an area behind the vehicle and emphasizes the rear area, to the remote control device.

13 Claims, 19 Drawing Sheets

32R 10 km/h DECELERATION W

(56) References Cited

U.S. PATENT DOCUMENTS

| | | | | |
|---|---|---|---|---|
| 2017/0347002 A1* | 11/2017 | Baker | .................... | G06V 20/56 |
| 2018/0074490 A1* | 3/2018 | Park | .................... | G05D 1/0027 |
| 2018/0095457 A1* | 4/2018 | Lee | .................... | G05D 1/0022 |
| 2021/0080943 A1* | 3/2021 | Iwamoto | ............ | G01C 21/3407 |
| 2021/0287548 A1* | 9/2021 | Lai | .................... | B60R 1/025 |
| 2023/0081876 A1 | 3/2023 | Matsumoto | | |
| 2023/0367311 A1* | 11/2023 | Itsumi | ................. | G05D 1/2247 |

* cited by examiner

Figure 1:
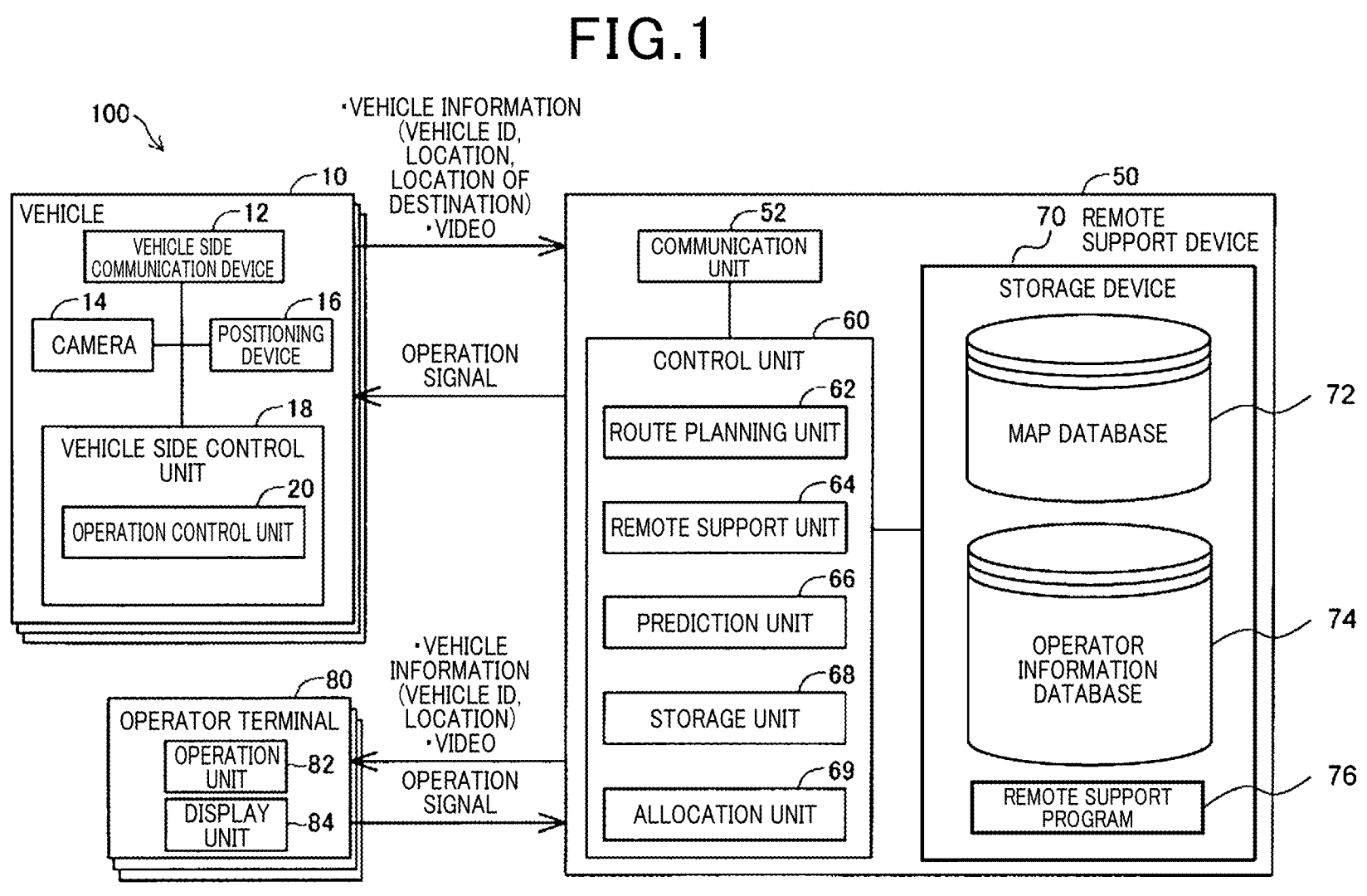

VEHICLE 10
- VEHICLE SIDE COMMUNICATION DEVICE 12
- CAMERA 14
- POSITIONING DEVICE 16
- VEHICLE SIDE CONTROL UNIT 18
  - OPERATION CONTROL UNIT 20

·VEHICLE INFORMATION (VEHICLE ID, LOCATION, LOCATION OF DESTINATION)
·VIDEO

OPERATION SIGNAL

REMOTE SUPPORT DEVICE 50

COMMUNICATION UNIT 52

CONTROL UNIT 60
- ROUTE PLANNING UNIT 62
- REMOTE SUPPORT UNIT 64
- PREDICTION UNIT 66
- STORAGE UNIT 68
- ALLOCATION UNIT 69

STORAGE DEVICE 70
- MAP DATABASE 72
- OPERATOR INFORMATION DATABASE 74
- REMOTE SUPPORT PROGRAM 76

·VEHICLE INFORMATION (VEHICLE ID, LOCATION)
·VIDEO

OPERATION SIGNAL

OPERATOR TERMINAL 80
- OPERATION UNIT 82
- DISPLAY UNIT 84

Figure 3:
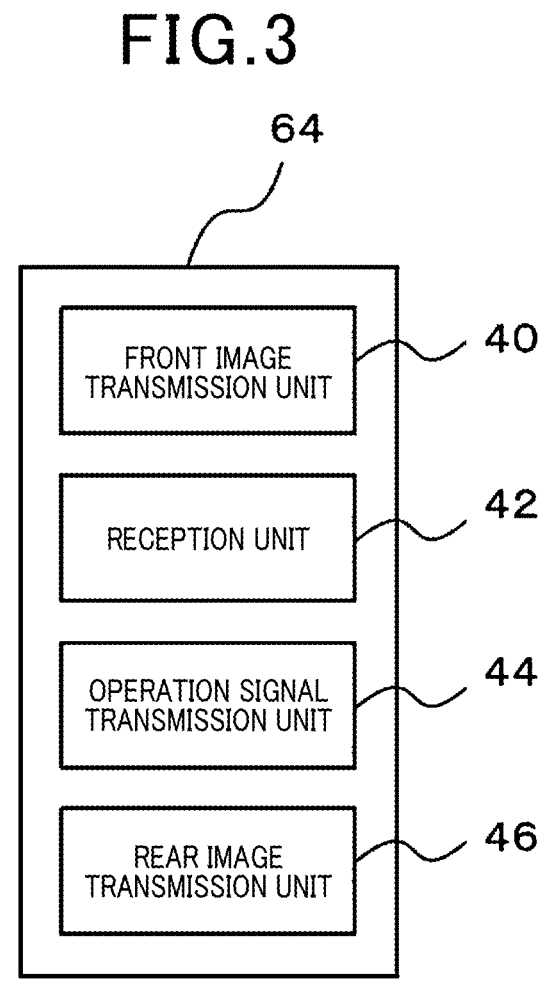

| FRONT IMAGE TRANSMISSION UNIT | 40 |

| RECEPTION UNIT | 42 |

| OPERATION SIGNAL TRANSMISSION UNIT | 44 |

| REAR IMAGE TRANSMISSION UNIT | 46 |

REMOTE SUPPORT DEVICE, REMOTE SUPPORT METHOD, AND STORAGE MEDIUM

CROSS-REFERENCE TO RELATED APPLICATION

The present application is based on and claims the benefit of priority from earlier Japanese Patent Application No. 2022-100595 filed on Jun. 22, 2022 and Japanese Patent Application No. 2023-005386 filed on Jan. 17, 2023, the descriptions of which are incorporated herein by reference.

BACKGROUND

Technical Field

The present disclosure relates to a remote support device, a remote support method, and a storage medium.

Related Art

Remote support devices are disclosed.

SUMMARY

An aspect of the present disclosure provides a remote support device including a front image transmission unit that, when remote support at a support point is requested from an autonomous driving vehicle, transmits a front image including at least an area in front of the autonomous driving vehicle captured by the autonomous driving vehicle to a remote control device that performs remote control for the autonomous driving vehicle; a reception unit that receives an operation signal corresponding to the remote control at the support point from the remote control device; an operation signal transmission unit that transmits the received operation signal to the autonomous driving vehicle; and a rear image transmission unit that, after the autonomous driving vehicle passes through a changing point set so as to change display on the remote control device based on the support point, transmits a rear image that is captured so as to include at least an area behind the autonomous driving vehicle and emphasizes the rear area, to the remote control device.

BRIEF DESCRIPTION OF THE DRAWINGS

In the accompanying drawings:

FIG. 1 is a diagram illustrating a configuration of an autonomous driving system;

FIG. 2 is a diagram for describing an imaging area;

FIG. 3 is a functional block diagram of a remote support unit;

DETAILED DESCRIPTION OF THE PREFERRED EMBODIMENTS

Figure 4:
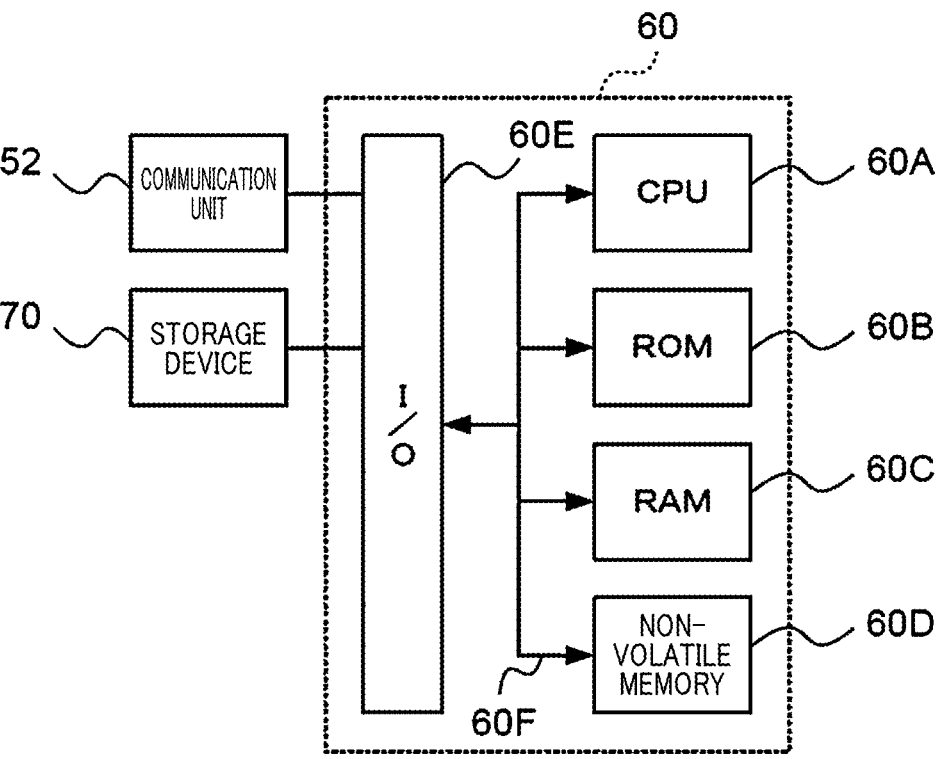
FIG. 4 is a diagram illustrating a hardware configuration of a remote support device.

JP 2021-170191 A discloses a remote support device including: a task allocation unit (40) which allocates a task for remotely controlling a vehicle (10) to an operator selected from among a plurality of operators whose operation ability is affirmed by the latest evaluation result stored in a storage unit (35); an evaluation acquisition unit (42) which acquires an evaluation result of the operation ability of the selected operator when the selected operator performs the task allocated by the task allocation unit, by using a remote control unit (41) for driving the vehicle through remote control by the operator; and a storage control unit (43) which performs control to cause the latest evaluation result acquired by the evaluation acquisition unit to be stored in the storage unit.

For operators performing remote control to support travel of autonomous driving vehicles and a remote operator participating in remote control such as a supervisor supervising the operators, an ability to accurately and promptly determine situations is required.

The technique disclosed in JP 2021-170191 A provides the result of evaluation of a task performed by an operator, to guarantee the ability of remote control of the operator.

However, since traffic situations are different every time even at the same remote point, the evaluation is likely to change every time. Hence, when remote control is performed, it is difficult to determine how to improve the control. Thus, according to the technique disclosed in JP 2021-170191 A, it is difficult to support improving the ability of the operator to determine situations.

The present disclosure aims to provide a remote support device, a remote support method, and a remote support program that can support improvement in an ability of staff, who participate in remote control for supporting travel of autonomous driving vehicles, to determine situations.

Hereinafter, embodiments for implementing the technique of the present disclosure will be described in detail.

First Embodiment

As illustrated in FIG. 1, an autonomous driving system 100 of the present embodiment includes a vehicle 10, a remote support device 50 disposed in an autonomous driving center, and an operator terminal 80, which is an example of a remote control device that is operated by an operator. The vehicle 10 of the present embodiment is an autonomously operated autonomous driving vehicle. The autonomous driving system 100 is a system for performing remote support for the vehicle 10 by an operator present at a remote point when the vehicle 10 (autonomous driving vehicle) arrives at a support point.

In the present embodiment, the remote support indicates controlling the vehicle 10 from a remote point by an operator or performing monitoring from the remote point by the operator using the vehicle 10. The support point indicates a location at which the vehicle 10 is difficult to autonomously travel or a location at which the operator can perform remote support for the vehicle. The support points include, for example, an intersection, a construction site, a parking lot, an expressway, a limited highway, a service area, a parking area, a baggage collection site, a tollgate, an interchange, and the like. However, these are not limitations.

The autonomous driving system 100 of the present embodiment includes one or more vehicles 10. Each of the vehicles 10 includes a vehicle side communication device 12, a camera 14, a positioning device 16, and a vehicle side control unit 18.

The vehicle side communication unit 12 performs radio communication with the remote support device 50.

Figure 2:
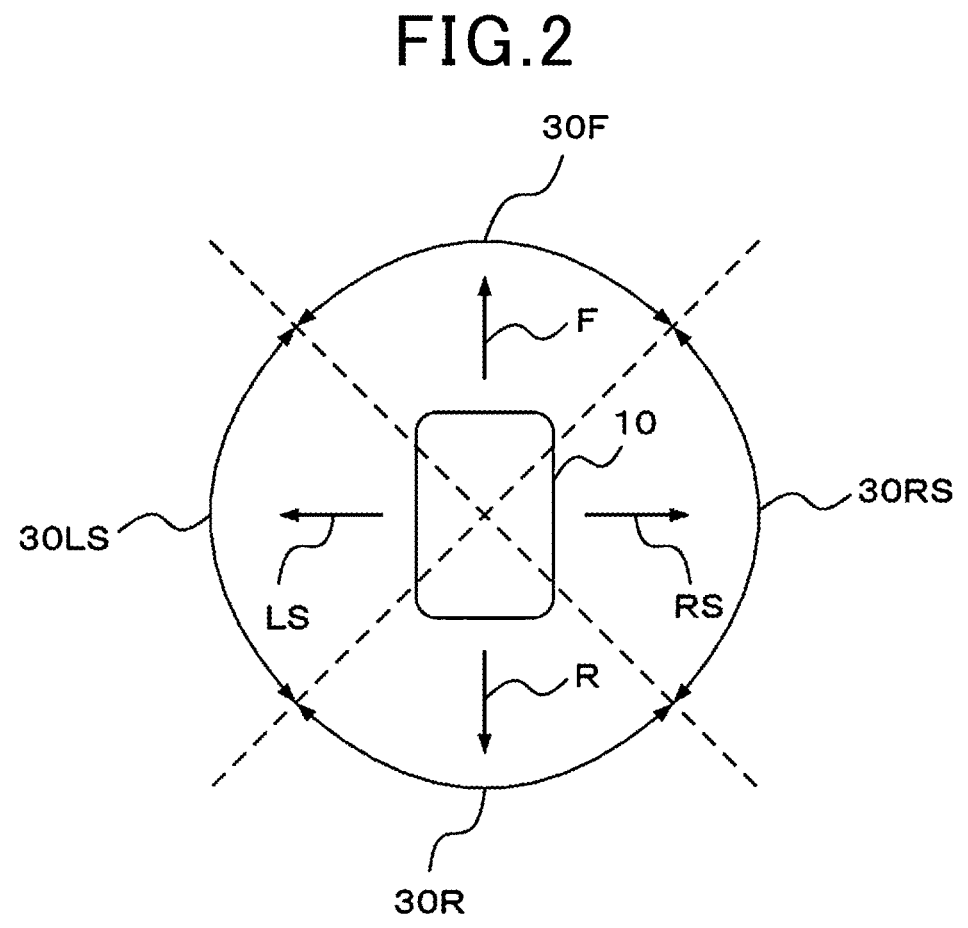

As illustrated in FIG. 2, the camera 14 captures images of a front area 30F, a right side area 30RS, a left side area 30LS, and a rear area 30R. The camera 14 may include four cameras capturing images of the respective areas or a 360-degree camera that can capture an image of all the areas. In the present embodiment, a configuration including the four cameras capturing images of the respective areas will be described. It is noted that, hereinafter, the camera capturing an image of an area including at least the front area 30F is referred to as a camera 14F, the camera capturing an image of an area including at least the right side area 30RS is referred to as a camera 14RS, the camera capturing an image of an area including at least the left side area 30LS is referred to as a camera 14LS, and the camera capturing an image of an area including at least the rear area 30R is referred to as a camera 14R, for the sake of convenience. It is noted that the cameras are referred to as cameras 14 without distinction between them.

As illustrated in FIG. 2, when the vehicle 10 is viewed in plan view, the front area 30F is an area of 45 degrees to the right and 45 degrees to the left with respect to a front direction (traveling direction) F of the vehicle 10, that is, an area of 90 degrees in total. When the vehicle 10 is viewed in plan view, the right side area 30RS is an area of 45 degrees to the right and 45 degrees to the left with respect to the a right direction RS of the vehicle 10, that is, an area of 90 degrees in total. When the vehicle 10 is viewed in plan view, the left side area 30LS is an area of 45 degrees to the right and 45 degrees to the left with respect to a left direction LS of the vehicle 10, that is, an area of 90 degrees in total. When the vehicle 10 is viewed in plan view, the rear area 30R is an area of 45 degrees to the right and 45 degrees to the left with respect to a rear direction (backward direction) R of the vehicle 10, that is, an area of 90 degrees in total.

The positioning device 16 includes a GPS (global positioning system) receiver or a GNSS (global navigation satellite system), and determines the current location of the vehicle 10.

The vehicle side control unit 18 controls the vehicle side communication device 12, the camera 14, and the positioning device 16. In addition, the vehicle side control unit 18 is configured as a computer including a CPU and a memory, and functions as an operation control unit 20 by the CPU executing a program stored in the memory.

The operation control unit 20 controls operations of a vehicle (acceleration, deceleration, braking, steering) based on remote control by an operator. In addition, the operation control unit 20 repeatedly transmits vehicle information including identification data (vehicle ID) and current location information of the vehicle 10 to the remote support device 50 through the vehicle side communication device 12 at predetermined intervals. The vehicle information may include information for identifying the type of the vehicle 10 and occupants and information indicating the location of a destination. In addition, when the operator performs remote control for the vehicle 10, the operation control unit 20 transmits images captured by the camera 14 to the remote support device 50 via the vehicle side communication device 12. In the present embodiment, the captured images are, for example, dynamic images (video).

The remote support device 50 includes a communication unit 52, a control unit 60, and a storage device 70.

The communication unit 52 performs radio communication with the vehicle 10. In addition, the communication unit 52 performs wire or wireless communication with the operator terminal 80.

The storage device 70 stores a map database 72, an operator information database 74, and a remote support program 76.

In the map database 72, locations of support points are registered. In addition, the map database 72 stores road data indicating connection states of intersections and roads, traffic congestion information, traffic regulation information, traffic information including traffic volumes of respective support points, and the like. The traffic information is acquired from another server through, for example, the communication unit 52, and is stored.

The operator information database 74 stores, for example, schedules of operators performing remote support for vehicles, the number of currently available operators, contents of remote support, histories of traffic volumes of respective support points, histories of required time periods for remote support, and the like.

The control unit 60 performs control of the communication unit 52 and the storage device 70. The control unit 60 functionally includes a route planning unit 62, a remote support unit 64, a prediction unit 66, a storage unit 68, and an allocation unit 69.

The route planning unit 62 specifies routes on which the vehicles 10 travel. More specifically, the route planning unit 62 specifies routes through which the vehicles 10 travel from a point of departure to a destination through support points, based on the road data, the traffic information, and the locations of the support points stored in the map database 72. The point of departure, the destination, and the support points are, for example, set by an operator or a controller thereof or set in response to a request from the vehicle 10. The route planning unit 62 delivers the specified routes to the vehicles 10 through the communication unit 52. It is noted that the routes may be specified by the vehicle side control units 18 of the vehicles 10. It is noted that the routes may be specified in response to requests from the vehicles 10.

The remote support unit 64 performs remote support for the vehicle 10 at a remote point based on remote control by an operator. As illustrated in FIG. 3, the remote support unit 64 includes a front image transmission unit 40, a reception unit 42, an operation signal transmission unit 44, and a rear image transmission unit 46.

When remote support at a remote point is requested from the vehicle 10, the front image transmission unit 40 transmits, as a front image including at least an area in front of the vehicle 10 captured by the vehicle 10, a front image including, for example, the front area 30F to the operator terminal 80 for performing remote control of the vehicle 10.

The reception unit 42 receives an operation signal corresponding to the remote control at the remote point from the operator terminal 80.

The operation signal transmission unit 44 transmits the operation signal received from the operator terminal 80 to the vehicle 10.

After the vehicle 10 passes through a changing point set so as to change display on the operator terminal 80 based on the support point, the rear image transmission unit 46 transmits, as a rear image which is captured by the vehicle 10 so as to include at least a rear area of the vehicle 10 and which emphasizes the rear area, for example, a rear image including the rear area 30R, to the operator terminal 80.

The prediction unit 66 predicts timing, at which the operator starts remote support of the vehicle 10, based on scheduled time at which the vehicle 10 arrives at a support point included in the route specified by the route planning unit 62, and predicts a time period during which the remote support is performed (hereinafter, referred to as a required time period). For example, the prediction unit 66 can learn a past relationship between the required time period and traffic volume to predict a required time period from the result of the learning and the current traffic volume. The prediction unit 66 of the present embodiment includes a function of predicting the number of operators for simultaneously supporting a plurality of vehicles, based on the scheduled times at which the vehicles arrive at support points included in the routes specified for the respective vehicles 10.

The storage unit 68 stores histories of the number of operators that performed remote support at respective periods of time. In addition, the storage unit 68 stores histories of required times, for which remote support for the vehicle 10 is performed by operators at support points, in the operator information database 74 for the respective support points. In addition, the storage unit 68 stores histories of traffic volumes in the operator information database 74 for the respective support points. In addition, the storage unit 68 stores support contents in the operator information database 74. The support contents include, for example, right turn support and left turn support at intersections, opening and closing support of doors and start support at bus stops, obstacle avoidance, and support for pedestrians at intersections.

The allocation unit 69 allocates operators to support points included in the routes of the vehicles 10 at the start timing of remote support predicted by the prediction unit 66 or the timing when the allocation unit 69 receives a remote support request from the vehicle 10, and determines schedules for respective operators. The allocation unit 69 stores the determined schedules in the operator information database 74. In the schedules, for example, the time on which remote support is performed, a support point, and a vehicle are registered for the operators. It is noted that, in the present embodiment, a case will be described in which an operator is allocated when a remote support request is received from the vehicle 10.

FIG. 4 is a diagram illustrating a hardware configuration of the control unit 60. The control unit 60 is configured by a device including a typical computer.

As illustrated in FIG. 4, the control unit 60 includes a CPU (central processing unit) 60A, a ROM (read only memory) 60B, a RAM (random access memory) 60C, a non-volatile memory 60D, and an input-output interface (I/O) 60E. The CPU 60A, the ROM 60B, the RAM 60C, the non-volatile memory 60D, and the I/O 60E are connected to each other via a bus 60F. The I/O 60E is connected with the communication unit 52 and the storage device 70.

The CPU 60A is an example of a computer. Herein, the computer indicates a processor in the broad sense of the word and includes a general-purpose processor (e.g., CPU), a dedicated processor (e.g., GPU: graphics processing unit, ASIC: application specific integrated circuit, FPGA: field programmable gate array, a programmable logical device, or the like).

The storage device 70 is configured by a non-volatility storage device such as a hard disk. The CPU 60A reads and executes the remote support program 76 stored in the storage device 70. Hence, the CPU 60A functions as function parts configuring the control unit 60 described above. It is noted that the remote support program 76 may be stored in a non-volatility non-transitory storage medium or distributed via a network and appropriately installed in the remote support device 50.

As an example of the non-volatility non-transitory storage medium, a CD-ROM (compact disc read only memory), a magnetic optical disk, an HDD (hard disk drive), a DVD-ROM (digital versatile disc read only memory), a flash memory, a memory card, and the like are possible.

The operator terminal 80 is configured as a computer including a CPU and a memory or a mobile terminal. The autonomous driving system 100 of the present embodiment includes one or more operator terminals 80. Each of the operator terminals 80 includes an operation unit 82 and a display unit 84. The operation unit 82 accepts operation for remotely supporting the vehicle 10 from an operator. The accepted operation is transmitted, as an operation signal, to the vehicle 10 via the remote support device 50. The display unit 84 displays a user interface provided for operation by the operator. In addition, the display unit 84 displays video of the camera 14 transmitted from the vehicle 10.

Figure 5:
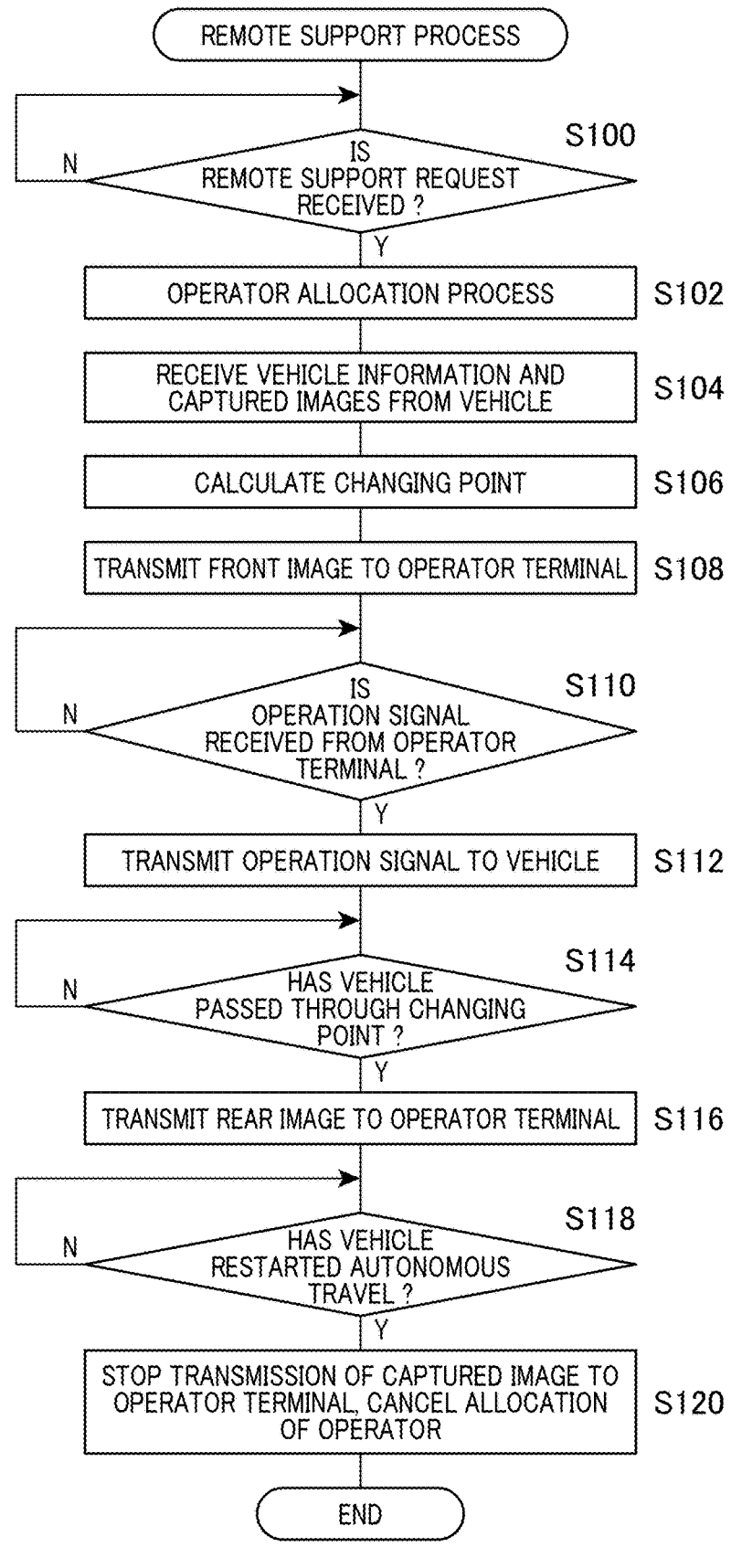
FIG. 5 is a flowchart of a remote support process.

With reference to FIG. 5, a remote support process performed by the CPU 60A of the control unit 60 of the autonomous driving system 100 will be described. The remote support process illustrated in FIG. 5 is repeatedly performed at predetermined intervals by the remote support device 50 while the autonomous driving system 100 operates. Hereinafter, a case in which routes of the vehicle 10 are specified by the route planning unit 62 will be described.

When the vehicle 10 is performing autonomous driving along the set route, if the vehicle 10 determines that the vehicle 10 has arrived at a support point and remote support by an operator is necessary, the vehicle 10 transmits a remote support request to remote support device 50.

Hence, in step S100, the CPU 60A determines whether the CPU 60A has received a remote support request from the vehicle 10. If the CPU 60A has received a remote support request, the process proceeds to step S102. In contrast, if the CPU 60A has received no remote support request, the CPU 60A waits until receiving a remote support request.

In step S102, the CPU 60A performs an allocation process for operators. Specifically, for example, based on the schedules stored in the operator information database 74, the CPU 60A allocates an operator to the vehicle 10 from which the remote support request has been received.

In step S104, the CPU 60A receives vehicle information and captured images transmitted from the vehicle 10. The captured images are four images (dynamic images) in respective areas captured by the cameras 14F, 14RS, 14LS, 14R. The vehicle information and the captured images are periodically transmitted from the vehicle 10, and after step S104, successively received until the present routine is terminated.

In step S106, after the remote support is terminated, the CPU 60A calculates the location of a changing point at which the type of the captured image to be transmitted to the operator terminal 80 is changed. Specifically, based on the current location of the vehicle 10 included in the vehicle information received in step S104, that is, the location of a support point at which the remote support is requested, and the route of the vehicle 10, the location of the changing point is calculated. Specifically, the location of the changing point is the location of a point at which operation corresponding to the remote control can be assumed to be terminated when the vehicle 10 has passed through the changing point.

Figure 6A:
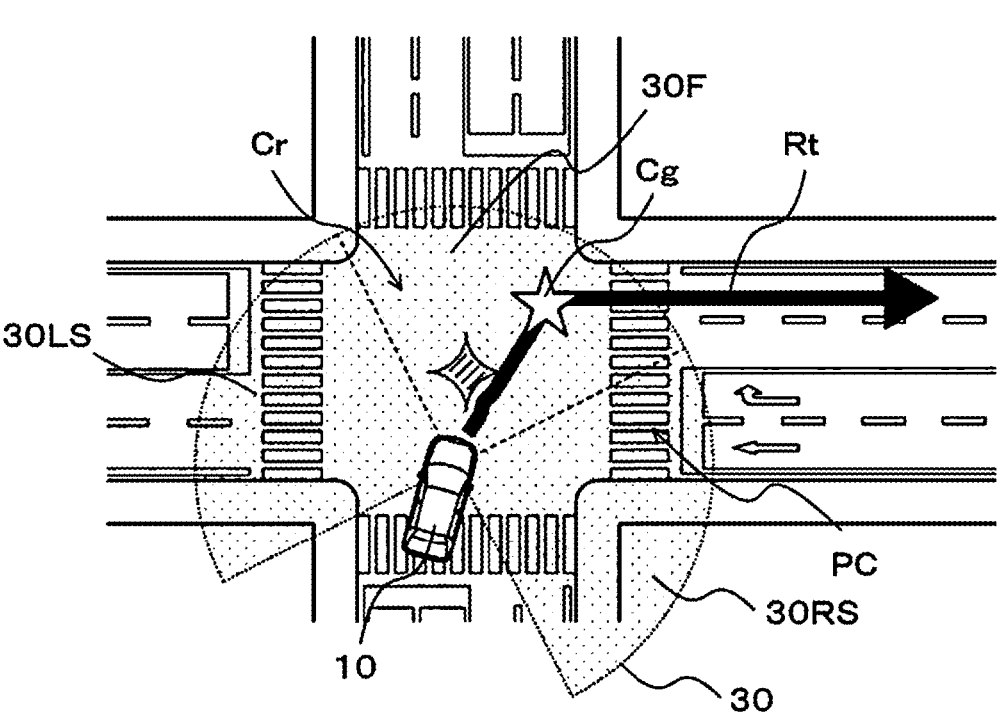
FIG. 6A is a diagram illustrating a state of a vehicle before remote support at an intersection.

For example, as illustrated in FIG. 6A, a case is assumed in which, in a situation in which the vehicle 10 turns right at an intersection Cr along a route Rt, the vehicle 10 requests remote support at the intersection Cr and is instructed on right turn as remote control. In this case, the point at which the vehicle 10 turns right is set as a changing point Cg.

Figure 7A:
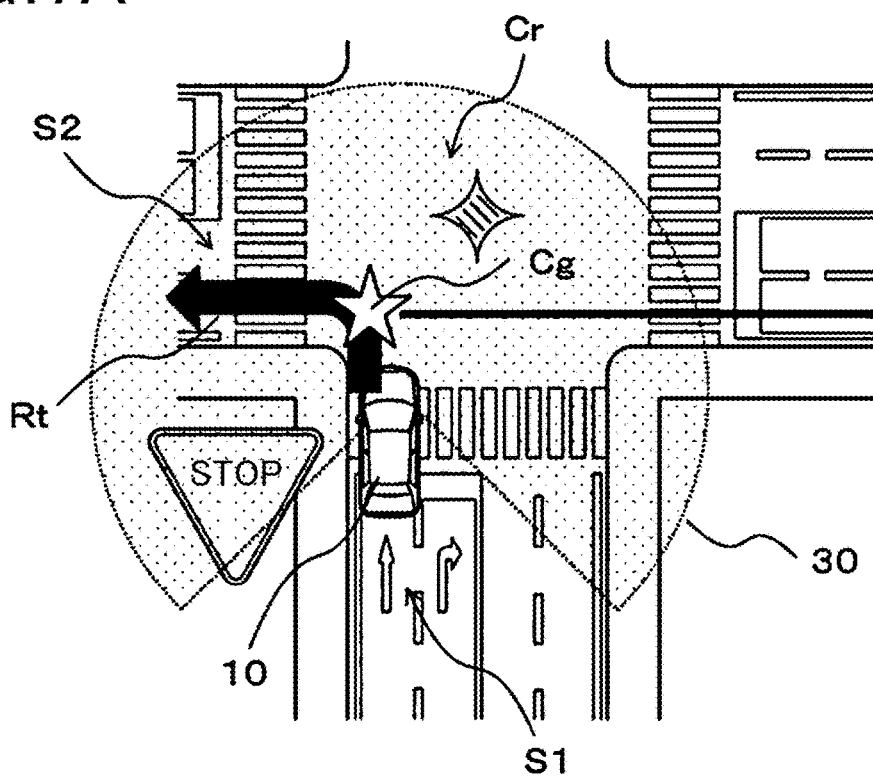
FIG. 7A is a diagram illustrating a state of a vehicle before remote support at an intersection.
Figure 7B:
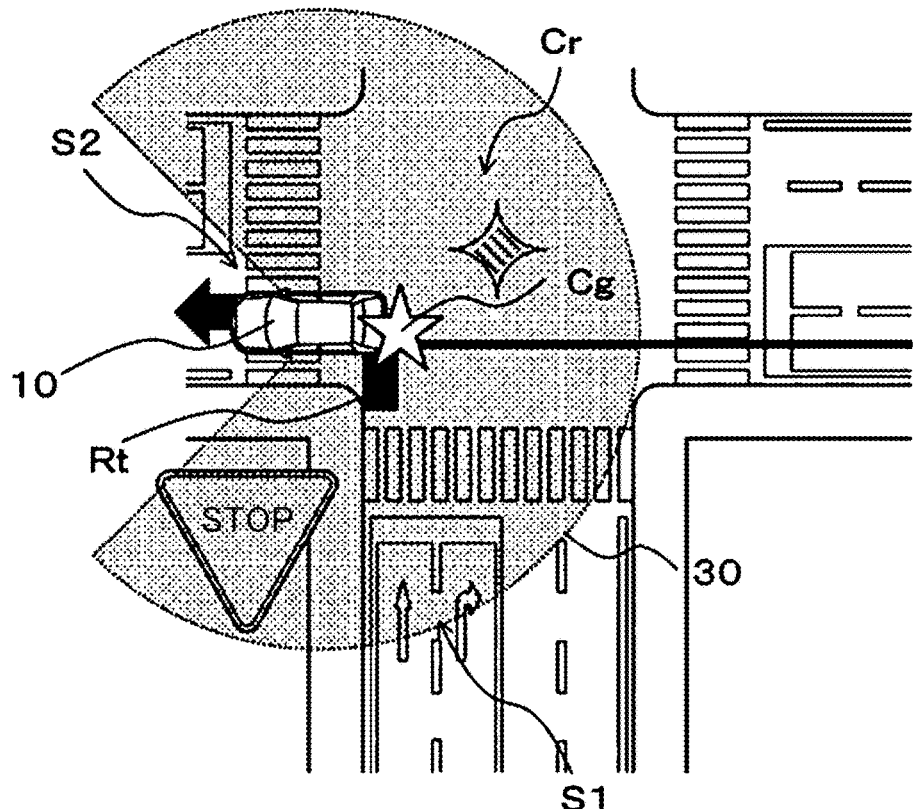
FIG. 7B is a diagram illustrating a state of the vehicle after the remote support at the intersection.

In addition, for example, as illustrated in FIG. 7A, a case is assumed in which, in a situation in which the vehicle 10 travels in a non-priority lane S1 along the route Rt, turns left at the intersection Cr, and travels in a priority lane S2, the vehicle 10 requests remote support short of the intersection Cr and is instructed on left turn as remote control. In this case, the point at which the vehicle 10 turns left is set as the changing point Cg.

Figure 8A:
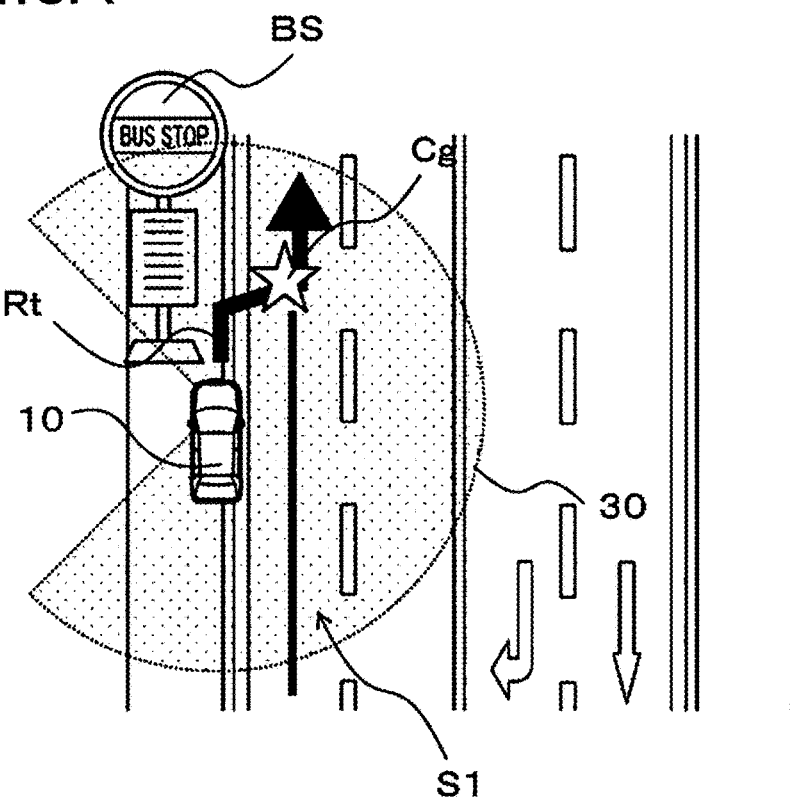
FIG. 8A is a diagram illustrating a state of a vehicle before remote support at a bus stop.
Figure 8B:
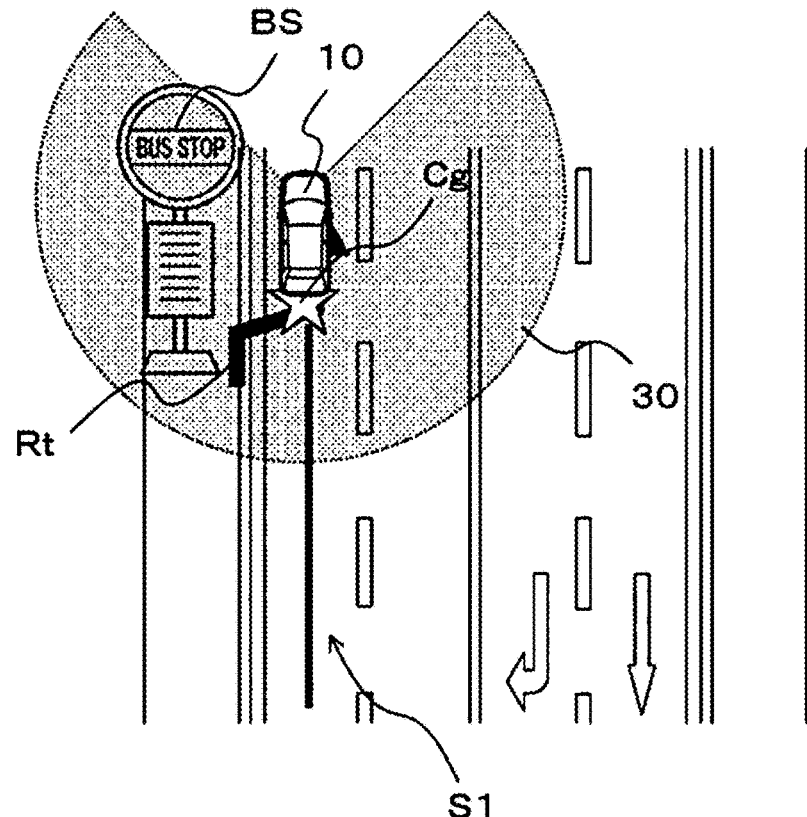
FIG. 8B is a diagram illustrating a state of the vehicle after the remote support at the bus stop.

In addition, for example, as illustrated in FIG. 8A, a case is assumed in which, in a situation in which the vehicle 10 stops at a bus stop BS along the route Rt, and thereafter starts and travels in the lane S1, the vehicle 10 requests remote support at the bus stop BS and is instructed on merging with the lane S1 as remote control. In this case, the point at which the vehicle 10 merges with lane S1 is set as the changing point Cg.

Figure 9A:
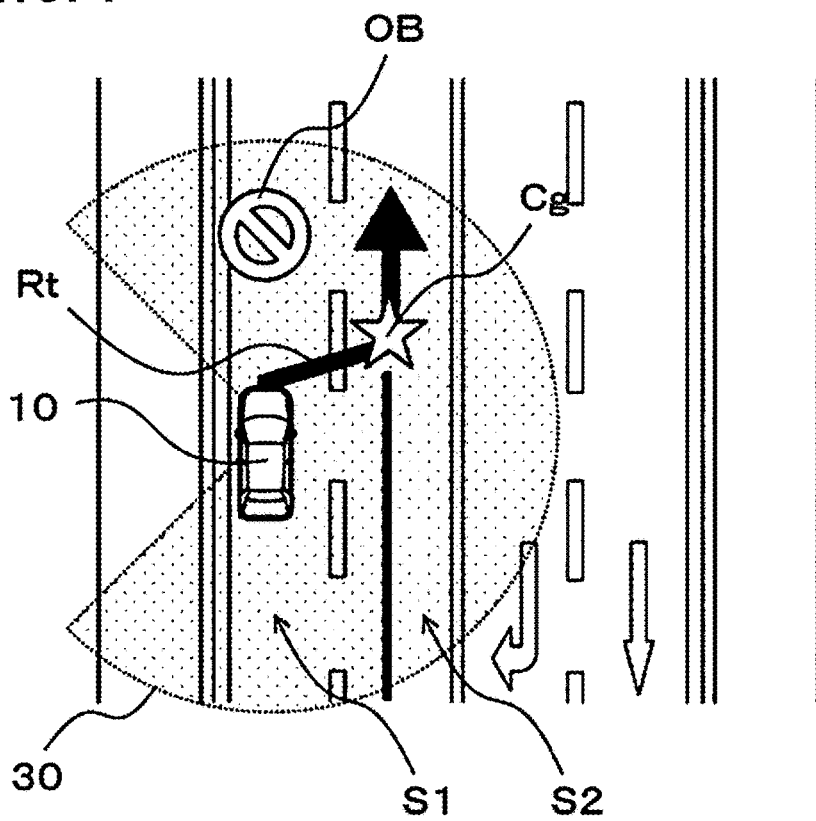
FIG. 9A is a diagram illustrating a state of a vehicle before remote support in a case in which an obstruction is present.
Figure 9B:
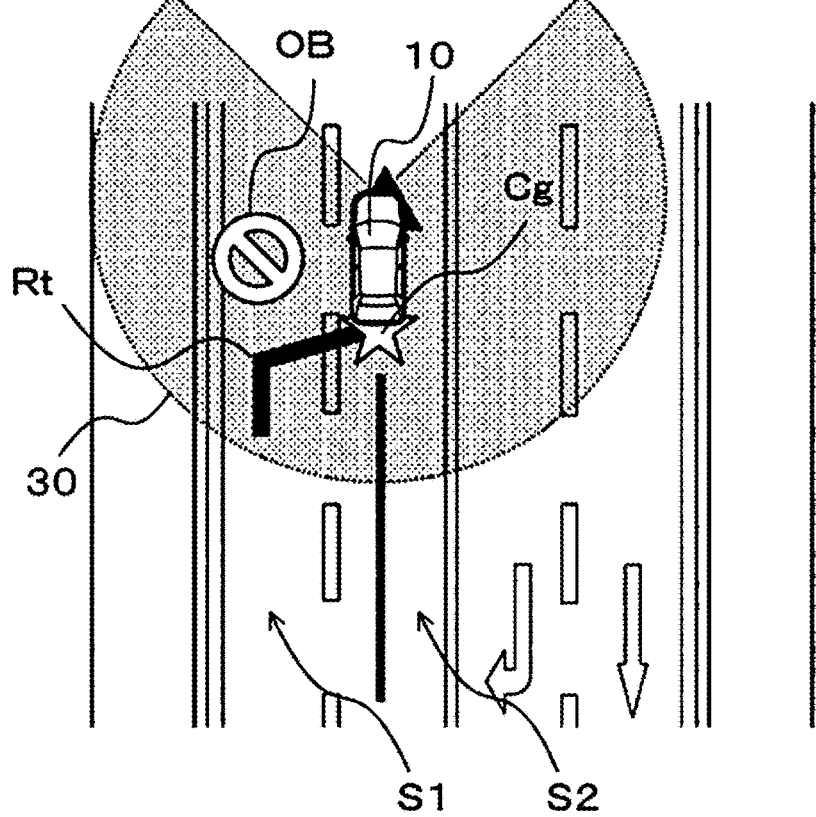
FIG. 9B is a diagram illustrating a state of the vehicle after the remote support in the case in which an obstruction is present.

In addition, for example, as illustrated in FIG. 9A, a case is assumed in which, in a situation in which the vehicle 10 meets an obstruction OB while traveling in the left lane S1 of two lanes on each side along the route Rt, the vehicle 10 requests remote support short of the obstruction OB and is instructed on traveling in the lane S2 on the right as remote control. In this case, the point at which the vehicle 10 performs lane change to the lane S2 is set as the changing point Cg.

Figure 10A:
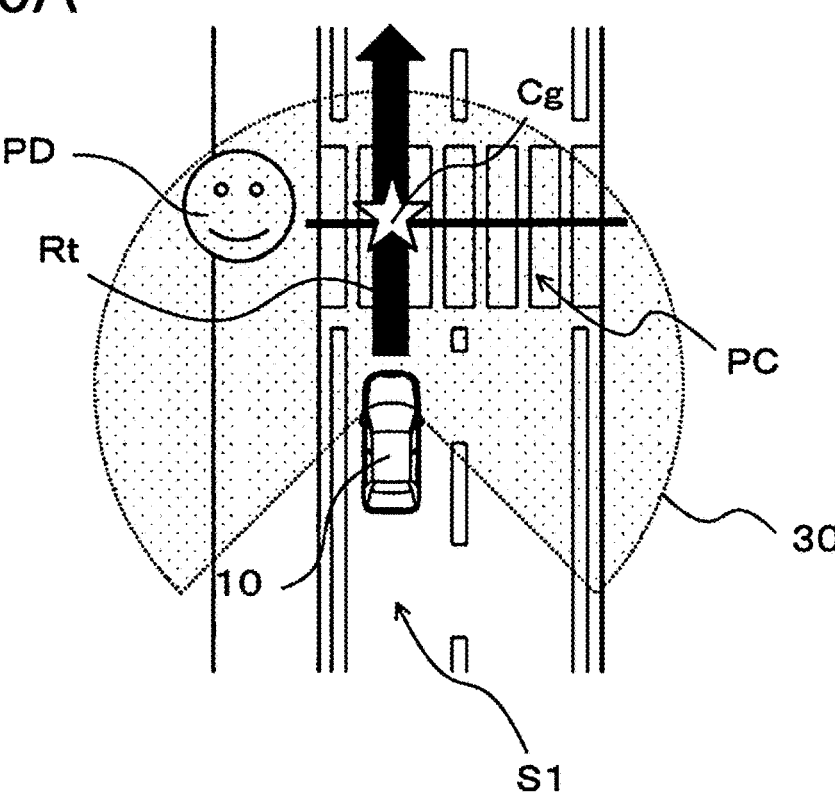
FIG. 10A is a diagram illustrating a state of a vehicle before remote support at a crosswalk.
Figure 10B:
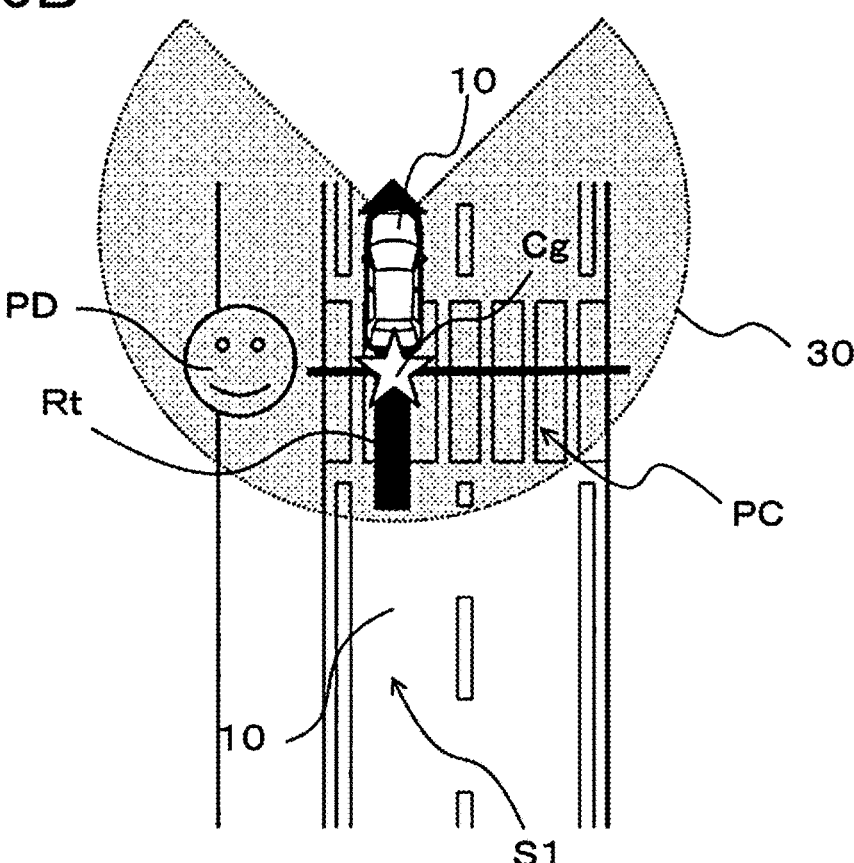
FIG. 10B is a diagram illustrating a state of the vehicle after the remote support at the crosswalk.

In addition, for example, as illustrated in FIG. 10A, a case is assumed in which after the vehicle 10 travels in the lane S1 along the route Rt, stops short of a crosswalk PC, requests remote support, and a pedestrian PD crosses the crosswalk PC, the vehicle 10 is instructed on start as remote control. In this case, the point at which the vehicle passes through the center of the crosswalk is set as the changing point Cg.

Figure 11:
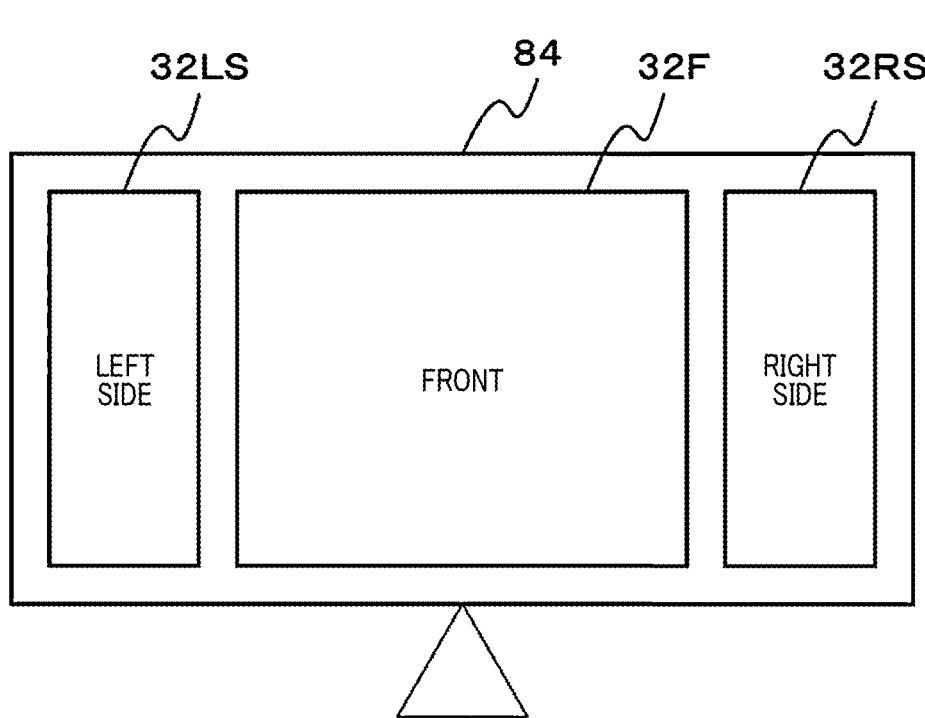
FIG. 11 is a diagram illustrating an example of a display screen of an operator terminal.

In step S108, for example, as illustrated in FIG. 6A, the CPU 60A transmits, as a front image, out of the captured images of the respective areas received in step S104, an image including a captured image 32F obtained by capturing an image of the front area 30F, a captured image 32RS obtained by capturing an image of the right side area 30RS, and a captured image 32LS obtained by capturing an image of the left side area 30LS to the operator terminal 80. Hence, as illustrated in FIG. 11, the display unit 84 of the operator terminal 80 displays the captured image 32F in the center thereof, the captured image 32RS on the right side thereof, and the captured image 32LS on the left side thereof.

In the examples illustrated in FIG. 6A, FIG. 7A, and FIG. 10A, the front image is a captured image of an area 30 including the front area 30F, the right side area 30RS, and the left side area 30LS. However, for example, as illustrated in FIGS. 8A, 9A, when the vehicle 10 travels in the diagonally forward right direction, a captured image of an area 30 including the front area 30F, the right side area 30RS, and the rear area 30R may be transmitted to the operator terminal 80 as the front image. It is noted that the processing of step S108 is repeatedly performed every time a captured image is received from the vehicle 10 until the present routine is terminated.

The operator of the operator terminal 80 checks the captured image displayed on the display unit 84, and operates the operation unit 82 to perform remote control for the vehicle 10. For example, as illustrated in FIG. 6A, in a situation in which the vehicle 10 turns right at the intersection Cr, the operator checks oncoming vehicles, pedestrians, and the like and performs an instruction to turn right at the timing when it is determined that right turn is allowed. When the operator operates the operation unit 82 to perform remote control for the vehicle 10, an operation signal corresponding to the remote control is transmitted to the remote support device 50.

Hence, in step S110, the CPU 60A determines whether the CPU 60A has received an operation signal from the operator terminal 80. If the CPU 60A has received an operation signal, the present process proceeds to step S112. In contrast, if the CPU 60A has received no operation signal, the CPU 60A waits until receiving an operation signal.

Figure 6B:
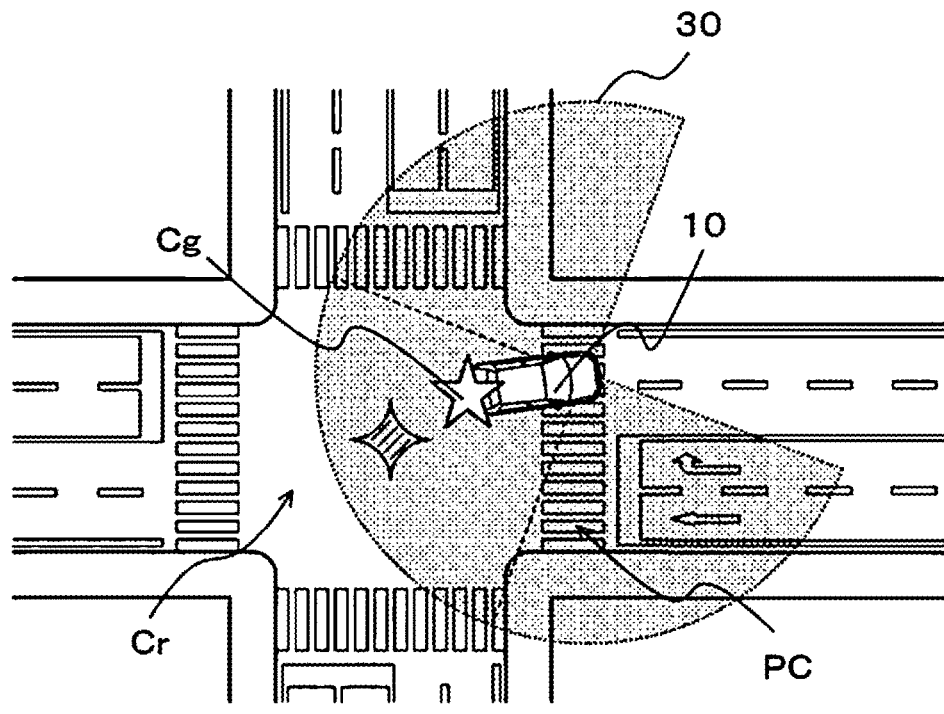
FIG. 6B is a diagram illustrating a state of the vehicle after the remote support at the intersection.

In step S112, the CPU 60A transmits the operation signal received in step S110 to the vehicle 10. Hence, the vehicle 10 operates in response to the operation signal. For example, as an example illustrated in FIG. 6A, when the operation signal indicates an instruction to turn right, the vehicle 10 turns right. Hence, as illustrated in FIG. 6B, the vehicle 10 turns right at the intersection Cr.

In step S114, it is determined whether the vehicle 10 has passed through the changing point Cg set in step S106. Specifically, based on a history of current locations and a route of the vehicle 10 included in vehicle information successively received from the vehicle 10, it is determined whether the vehicle 10 has passed through the changing point Cg.

Then, if the vehicle 10 has passed through the changing point Cg, the present process proceeds to step S116. In contrast, if the vehicle 10 has not passed through the changing point Cg, the CPU 60A waits until the vehicle 10 passes through the changing point Cg.

Figure 12:
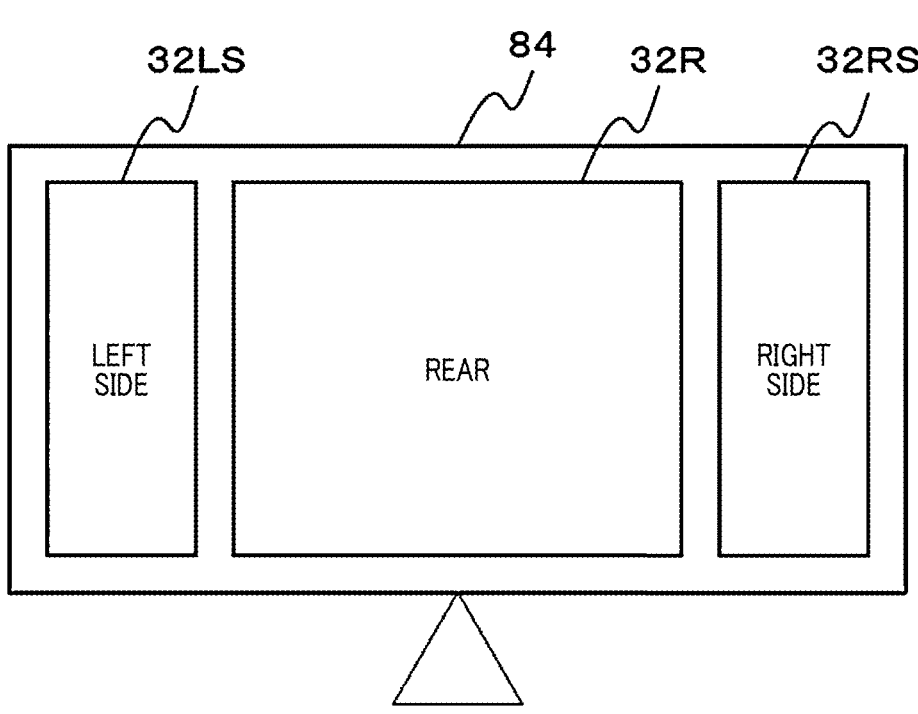
FIG. 12 is a diagram illustrating an example of the display screen of the operator terminal.

In step S116, the CPU 60A transmits, as a rear image, out of the captured images of the respective areas received from the vehicle 10, an image including the captured image 32R obtained by capturing an image of the rear area 30R, the captured image 32RS obtained by capturing an image of the right side area 30RS, and the captured image 32LS obtained by capturing an image of the left side area 30LS to the operator terminal 80. Hence, as illustrated in FIG. 12, the display unit 84 of the operator terminal 80 displays the captured image 32R in the center thereof, the captured image 32RS on the right side thereof, and the captured image 32LS on the left side thereof. That is, when the vehicle 10 has passed through the changing point Cg, the captured image 32F that has been displayed in the center of the display unit 84 is changed to the captured image 32R. Hence, the operator can check an area behind the vehicle 10 after the remote support. It is noted that the processing of step S116 is repeatedly performed every time a captured image is received from the vehicle 10 until the present routine is terminated.

Figure 13:
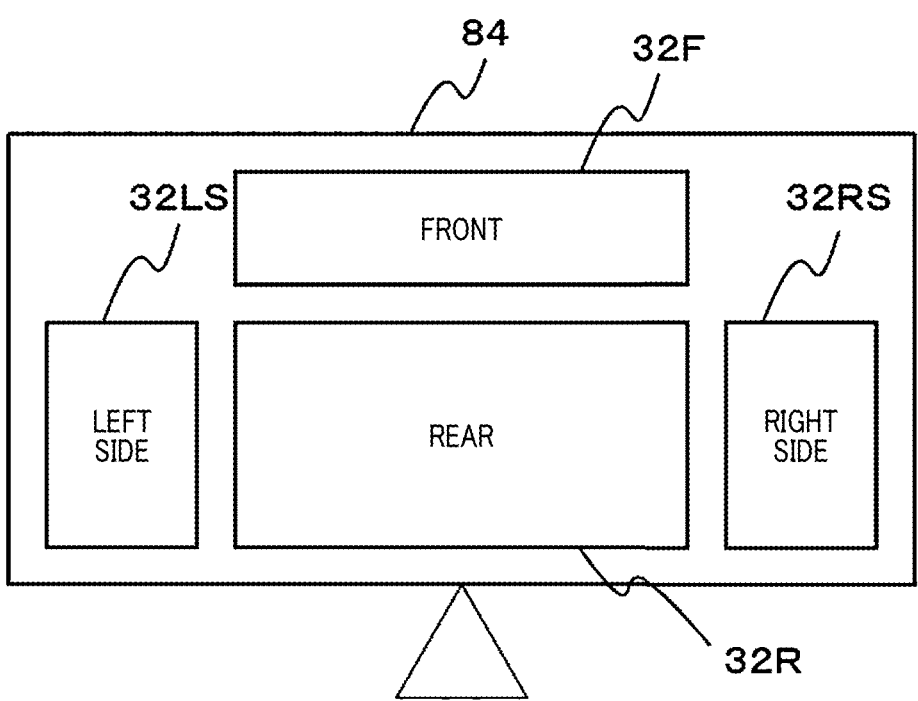
FIG. 13 is a diagram illustrating an example of the display screen of the operator terminal.
Figure 14:
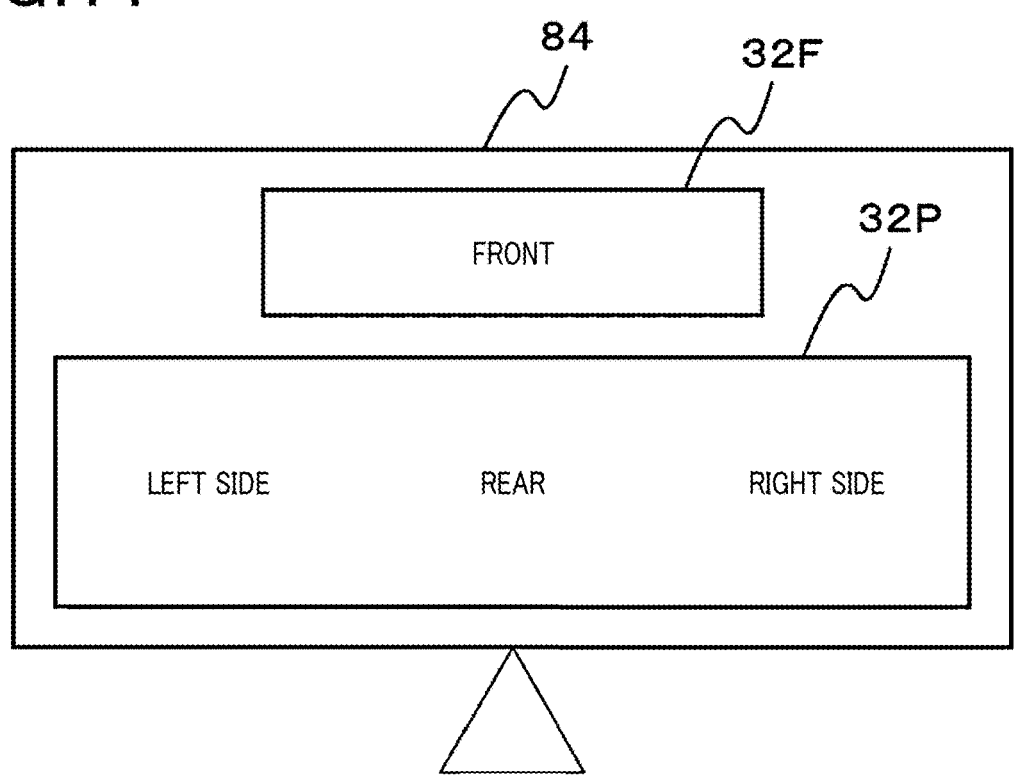
FIG. 14 is a diagram illustrating an example of the display screen of the operator terminal.

In addition, in addition to the rear image, the captured image 32F of the front area 30F may be transmitted to the operator terminal 80. Hence, as illustrated in FIG. 13, the captured image 32F is displayed on the upside of the display unit 84. Hence, the operator can check not only the area behind the vehicle but also an area in front of the vehicle. Furthermore, one captured image obtained by combining the captured image 32R, the captured image 32RS, and the captured image 32LS may be generated as a rear image and transmit the captured image to the operator terminal 80. Hence, as illustrated in FIG. 14, the display unit 84 of the operator terminal 80 displays the rear image as a captured image 32P such as one panoramic image.

In the example illustrated in FIG. 6A, until the vehicle 10 passes through the changing point Cg, which is a point at which the vehicle 10 turns right, a front image obtained by capturing an image of the area 30 including the front area 30F, the right side area 30RS, and the left side area 30LS is transmitted to the operator terminal 80 and is displayed on the display unit 84.

Then, when the vehicle 10 passes through the changing point Cg, as illustrated in FIG. 6B, a rear image obtained by capturing an image of the area 30 including the rear area 30R, the right side area 30RS, and the left side area 30LS is transmitted to the operator terminal 80 and is displayed on the display unit 84. It is noted that the cases illustrated in FIG. 7B, FIG. 8B, FIG. 9B, and FIG. 10B are similar.

As described above, when the vehicle 10 passes through the changing point Cg, the image displayed on the display unit 84 of the operator terminal 80 is changed from a front image to a rear image. Hence, the operator can easily make a self-assessment of whether the remote control indicated to the vehicle 10 by the operator is appropriate. For example, in the examples illustrated in FIGS. 6A and 6B, when the vehicle 10 has turned right at the intersection Cr and passed through the changing point Cg, the operator checks a rear image. However, if a pedestrian crossing a crosswalk is found in the rear image, it can be recognized that the pedestrian is likely to have been missed (overlooked) though the pedestrian has intended to cross the crosswalk PC. Thus, next time, since the operator is prompted to give particular attention to presence or absence of a pedestrian intending to cross a crosswalk, improvement in an ability of the operator to determine situations can be supported.

It is noted that, in the example illustrated in FIG. 6B, the rear image is an image of the area 30 including the rear area 30R, the right side area 30RS, and the left side area 30LS. However, a rear image of an imaging area determined depending on the contents of remote control may be transmitted to the operator terminal 80. For example, in the example illustrated in FIG. 6B, when important areas to be checked by the operator after the vehicle 10 turns right are the rear area 30R and the left side area 30LS, a captured image of the area 30 including the rear area 30R and the left side area 30LS may be transmitted to the operator terminal 80. As described above, the imaging area of the rear image to be transmitted to the operator terminal 80 may be predetermined depending on the contents of remote control.

In step S118, the CPU 60A determines whether the vehicle 10 has restarted autonomous travel. For example, after the vehicle 10 performs operation corresponding to an operation signal, the vehicle 10 transmits a cancel request for canceling the remote support request to the remote support device 50 to restart autonomous travel. Hence, it can be determined whether the autonomous travel has been restarted, based on, for example, whether the cancel request for canceling the remote support request is received from the vehicle 10.

If the vehicle 10 has restarted the autonomous travel, the process proceeds to step S120. In contrast, if the vehicle 10 has not restarted the autonomous travel, the CPU 60A waits until the autonomous travel is restarted.

In step S120, the CPU 60A stops transmission of the captured image to the operator terminal 80 and cancels allocation of an operator for remote support for the vehicle 10.

As described above, in the present embodiment, until the vehicle 10 passes through the changing point Cg, as a front image including at least an area in front of the vehicle 10, for example, a front image including the front area 30F is displayed on the display unit 84 of the operator terminal 80. After the vehicle 10 passes through the 10) changing point Cg, as a rear image including at least an area behind the vehicle 10, for example, a rear image including the rear area 30R is displayed on the display unit 84 of the operator terminal 80.

Hence, since the operator can easily and promptly make a self-assessment of whether remote control for the vehicle 10 by the operator is appropriate, improvement in an ability of the operator to determine situations can be supported.

Second Embodiment

The second embodiment will be described. In the second embodiment, a case will be described in which an observation area is detected based on an observation position of the operator, and a rear image including the detected observation area is displayed on the display unit 84 of the operator terminal 80 will be described.

Figure 15:
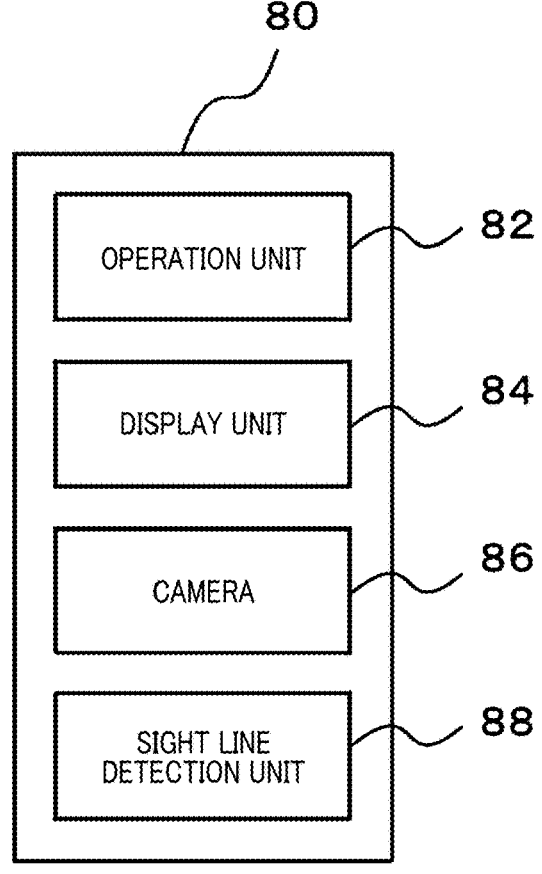
FIG. 15 is a functional block diagram of an operator terminal according to a second embodiment.

The operator terminal 80 according to the present embodiment includes, as illustrated in FIG. 15, in addition to the operation unit 82 and the display unit 84, a camera 86 and a sight line detection unit 88.

The camera 86 is disposed at a position at which an image of eyes of the operator can be captured and captures the image of the eyes of the operator.

The sight line detection unit 88 detects a sight line position indicating a position in a front image, which is displayed on the display unit 84, at which the operator looks, based on the image that is captured by the camera 86 and includes the eyes of the operator, and successively transmits sight line position information indicating the detected sight line position to the remote support device 50.

The reception unit 42 of the remote support device 50 receives the sight line position information transmitted from the operator terminal 80. When the vehicle 10 passes through the changing point Cg and transmits a rear image to the operator terminal 80, the rear image transmission unit 46 specifies an observation area based on the sight line position information received from the operator terminal 80 and transmits a rear image including the specified observation area to the operator terminal 80. Herein, the observation area is an area in which the sight line position remains for a predetermined time period (e.g., two seconds) or more.

Figure 16:
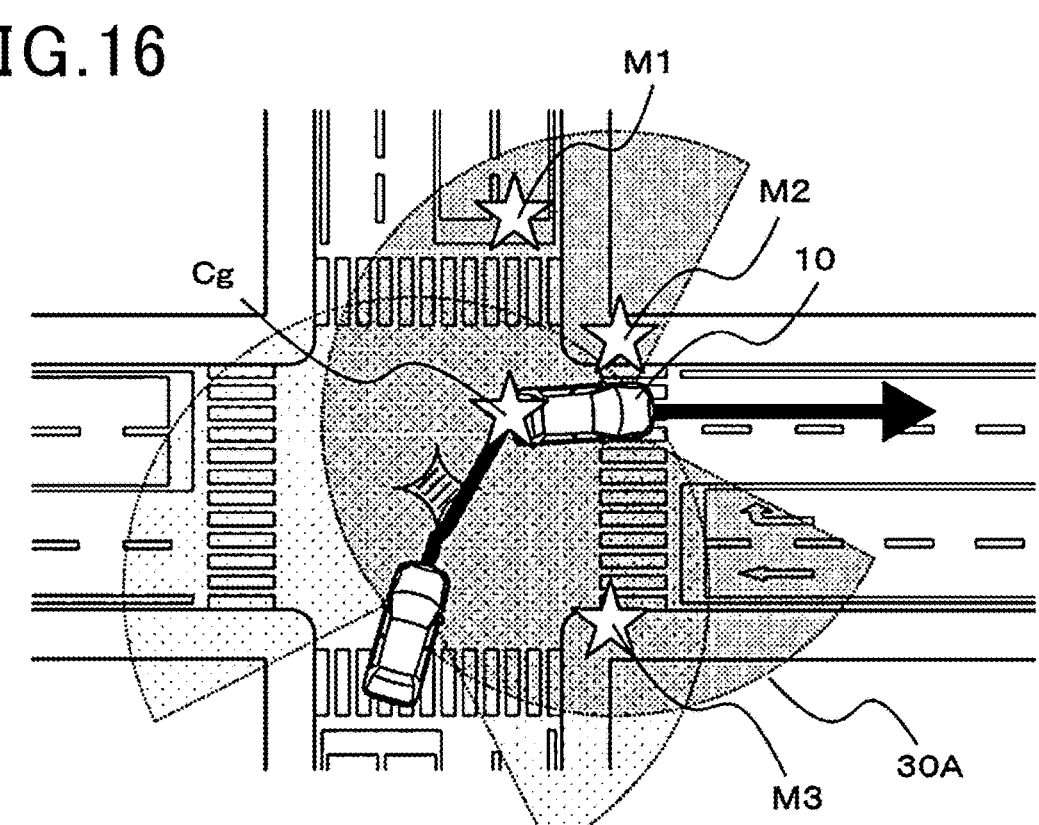
FIG. 16 is a diagram for describing a rear image including an observation area of an operator.

When a plurality of observation areas are present, for example, as illustrated in FIG. 16, when three observation areas M1, M2, M3 are present, the remote support device 50 transmits a rear image including all the observation areas M1, M2, M3 to the operator terminal 80.

It is noted that a rear image including an observation area, an observation time period for which is the longest among a plurality of observation areas, may be transmitted to the operator terminal 80. For example, in a case in which the observation time period for the observation area M1 is the longest among the observation areas M1, 20 M2, M3, a rear image including at least the observation area M1 may be transmitted to the operator terminal 80.

Figure 17:
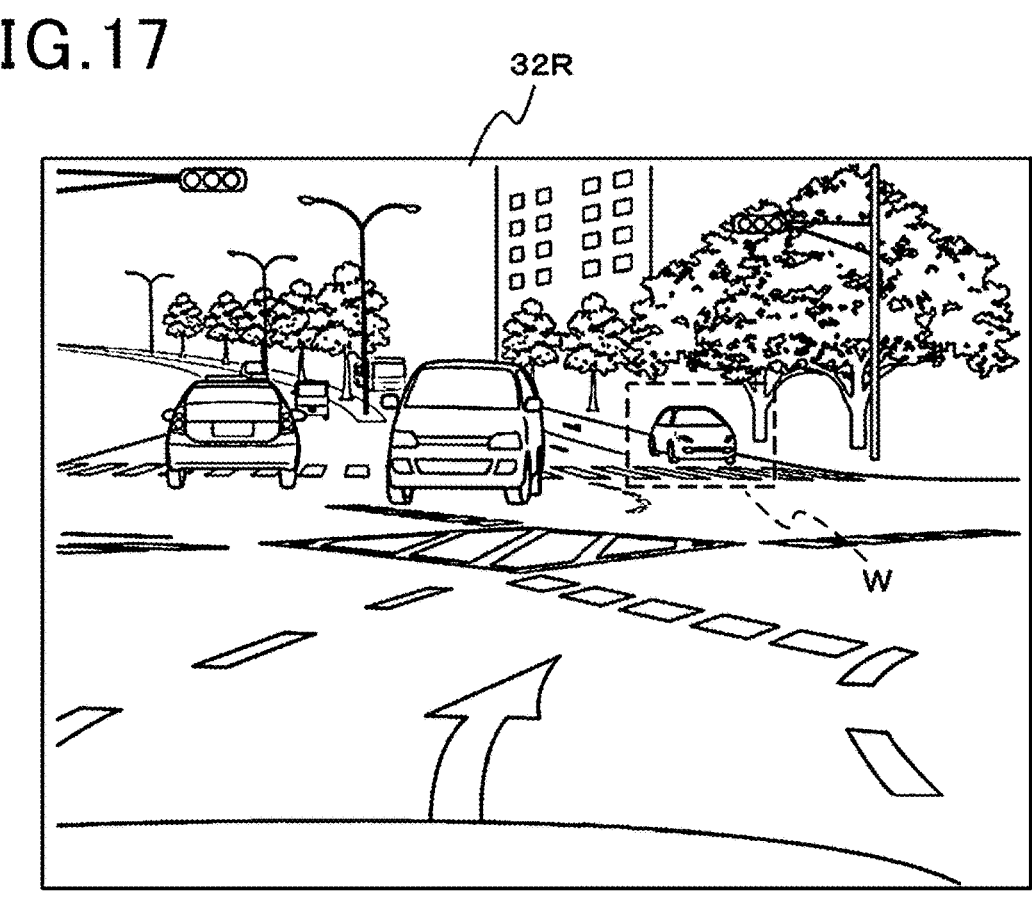
FIG. 17 is a diagram for describing a missed (overlooked) object.

In addition, the rear image transmission unit 46 may transmit a rear image in which an object missed by the operator, which is specified based on the observation area, is emphasized to the operator terminal 80. For example, a known object extraction process is performed for the rear image to extract the object. Herein, the object is a movable object such as a human and a vehicle. Then, out of the objects extracted from the rear image, the object outside the observation area is set as an object missed by the operator. Then, a rear image in which the missed object is emphasized is transmitted to operator terminal 80. For example, as illustrated in FIG. 17, the missed object is surrounded by a frame W in the captured image 32R of the rear area 30R to emphasize the missed object and the captured image 32R is transmitted to the operator terminal 80. Hence, the operator can easily recognize the object that is likely to have been missed by the operator.

In addition, the rear image transmission unit 46 may transmit a rear image, in which a newly detected object, which is not detected from the front image, is emphasized, to the operator terminal 80. Hence, for example, a vehicle, a pedestrian, and the like which are in a blind corner in a front image and which the operator cannot be recognized can be easily found in the rear image. Also in this case, as illustrated in FIG. 17, an object newly detected in the rear image is surrounded by, for example, a frame W to emphasize the object and the rear image is transmitted to the operator terminal 80. Hence, the operator can easily recognize the object that is in the blind corner and has not been noticed.

Figure 18:
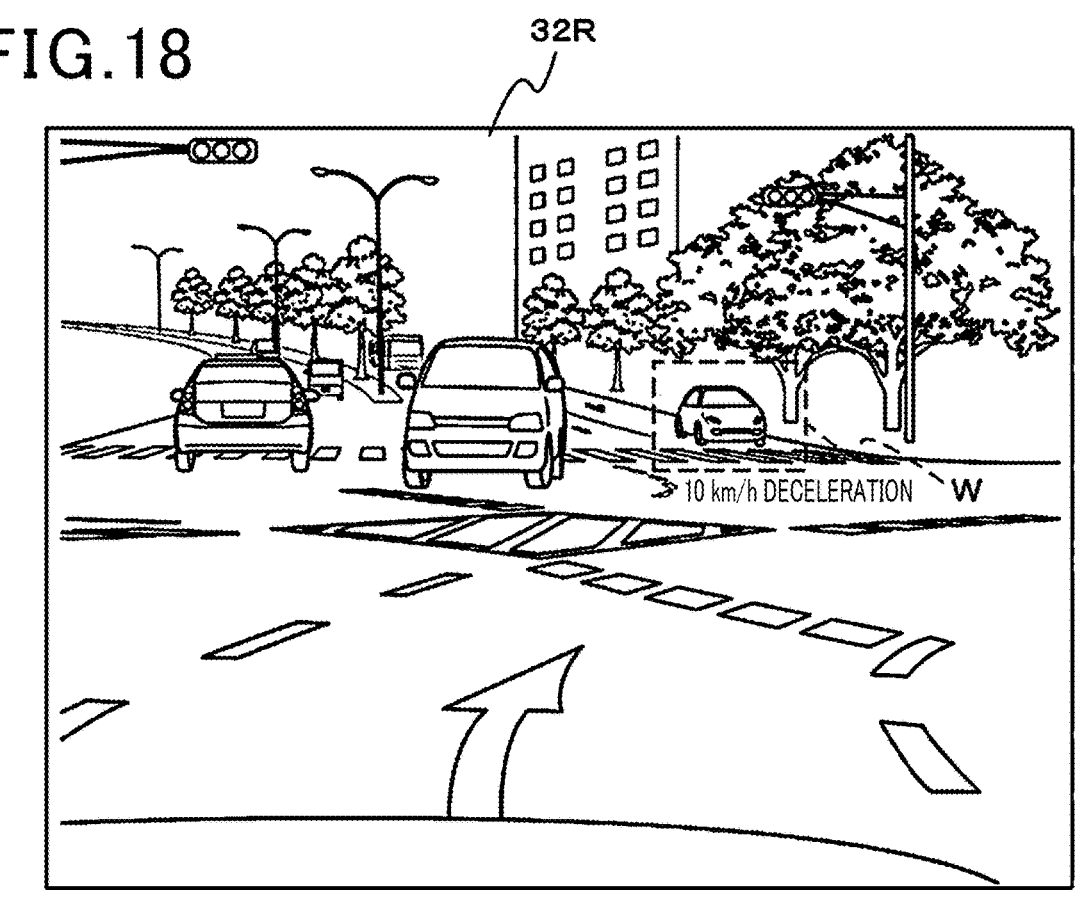
FIG. 18 is a diagram for describing change of speed of an oncoming vehicle.

In addition, the rear image transmission unit 46 may transmit a rear image on which speed information is displayed regarding change of speed of an oncoming vehicle detected by the vehicle 10 to the operator terminal 80. In this case, the vehicle 10 includes a radar device. Then, the vehicle 10 detects the speed information regarding change of speed of an oncoming vehicle and transmits the speed information to the remote support device 50. The rear image transmission unit 46 transmits the rear image on which the speed information of an oncoming vehicle is displayed to the operator terminal 80. For example, as illustrated in FIG. 18, when the speed information received from the vehicle 10 is information indicating that the oncoming vehicle has decelerated by 10 km/h, the rear image on which the oncoming vehicle is surrounded by the frame W and letters "10 km/h deceleration" are displayed is transmitted to operator terminal 80. Hence, the operator can recognize that the oncoming vehicle has decelerated by 10 km/h in response to remote control by the operation and can easily recognize that the remote control is likely to be inappropriate.

Figure 19:
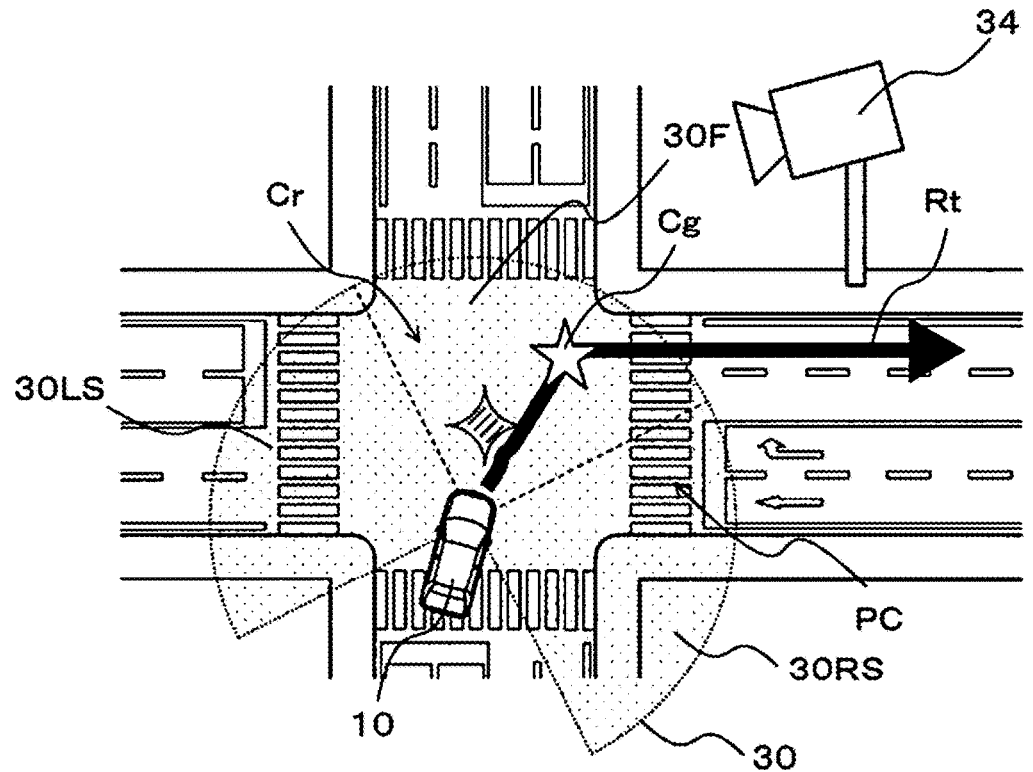
FIG. 19 is a diagram illustrating a crosswalk at which an infrastructure camera is installed.
Figure 20:
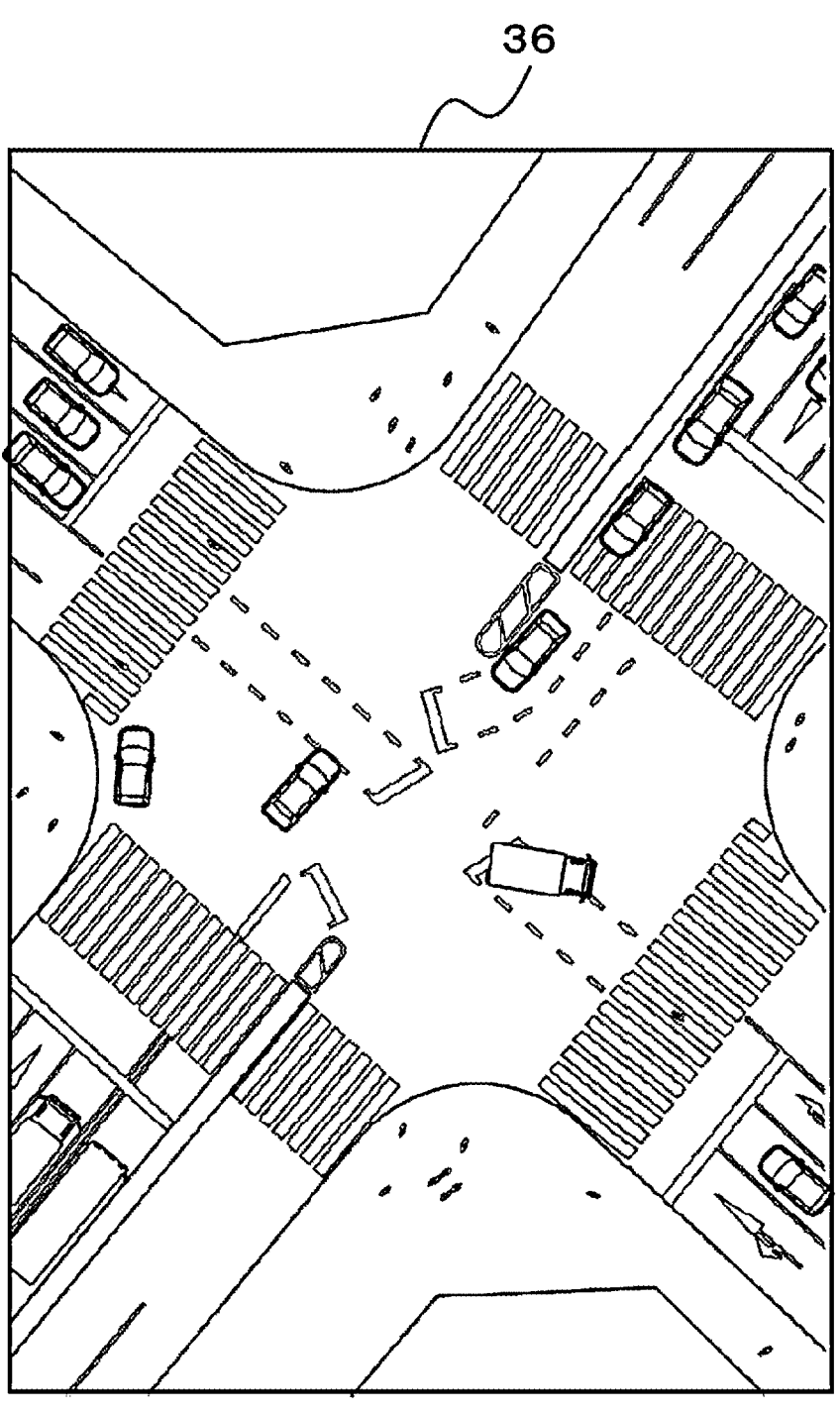
FIG. 20 is a diagram illustrating an example of a bird's eye image.

In addition, as illustrated in FIG. 19, when an infrastructure camera 34 that captures an image of an area including the changing point Cg in a bird's eye view is disposed, the rear image transmission unit 46 may acquire a bird's eye image from the infrastructure camera 34 and transmit the bird's eye image to the operator terminal 80. Hence, since the display unit 84 of the operator terminal 80 displays such a bird's eye image 36 as illustrated in FIG. 20, a situation around the vehicle 10 can be easily checked.

Third Embodiment

The third embodiment will be described. It is noted that the same part as those of the above embodiments is denoted by the same reference sign to omit redundant descriptions.

In the third embodiment, a modification of a front image transmitted to the operator terminal 80 in step S108 in FIG. 5 and a modification of a rear image transmitted to the operator terminal 80 in step S116 in FIG. 5 will be described.

Figure 21:
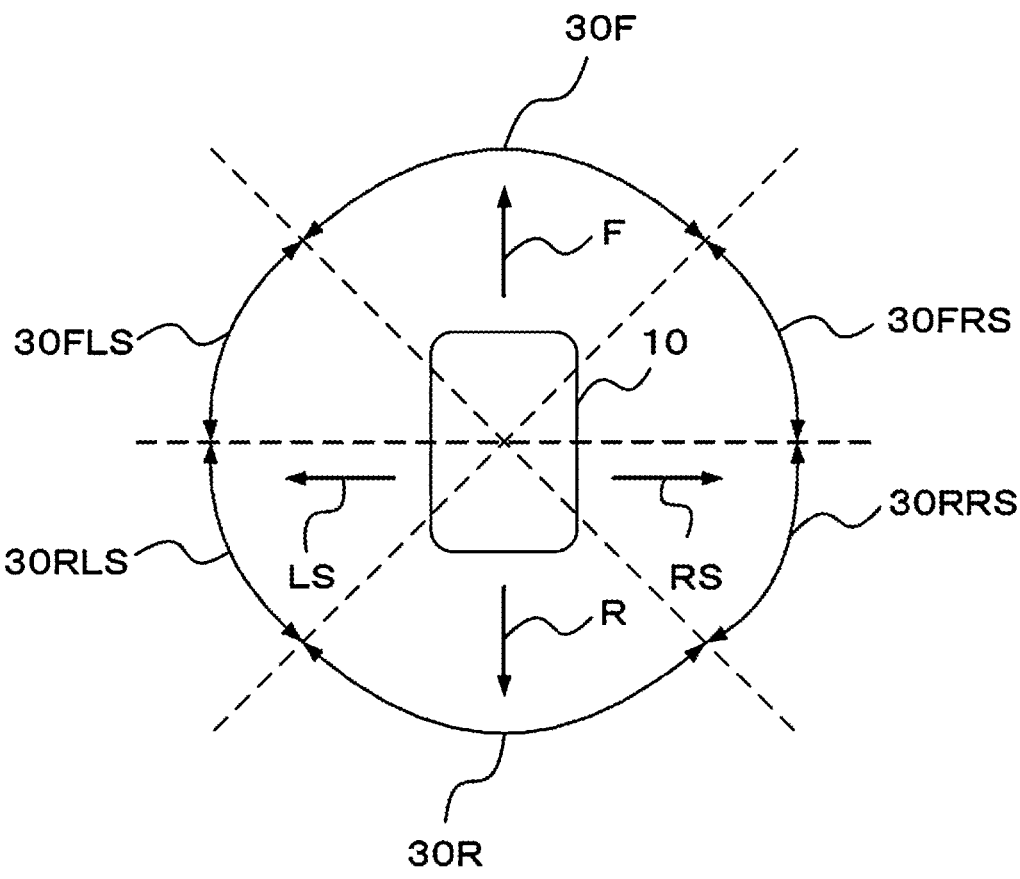
FIG. 21 is a diagram for describing an imaging area according to a third embodiment.

In the third embodiment, as illustrated in FIG. 21, the right side area 30RS illustrated in FIG. 2 is divided into a right front area 30FRS and a right rear area 30RRS. In addition, the left side area 30LS illustrated in FIG. 2 is divided into a left front area 30FLS and a left rear area 30RLS.

Then, in the third embodiment, in step S108 in FIG. 5, the CPU 60A transmits as a front image, an image including the captured image 32F obtained by capturing an image of the front area 30F, a captured image 32FRS obtained by capturing an image of the right front area 30FRS, a captured image 32FLS obtained by capturing an image of the left front area 30FLS, the captured image 32R obtained by capturing an image of the rear area 30R, a captured image 32RRS obtained by capturing an image of the right rear area 30RRS, and a captured image 32RLS obtained by capturing an image of the left rear area 30RLS to the operator terminal 80

Figure 22:
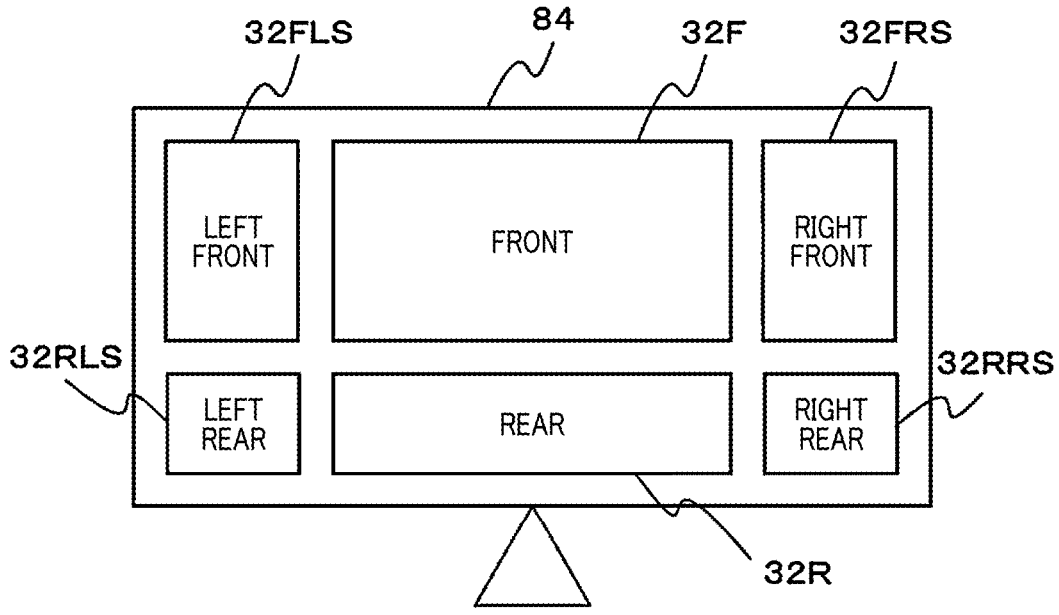
FIG. 22 is a diagram illustrating an example of a display screen of an operator terminal according to the third embodiment.

Hence, as illustrated in FIG. 22, the display unit 84 of the operator terminal 80 displays the captured images 32F, 32R in the center thereof, the captured images 32FRS, 32RRS on the right side thereof, and the captured images 32FLS, 32RLS on the left side thereof. It is noted that, in the example in FIG. 21, the display area of the captured image 32F is larger than that of the captured image 32R, the display area of the captured image 32FRS is larger than that of the captured image 32RRS, and the display area of the captured image 32FLS is larger than that of the captured image 32RLS. That is, the display unit 84 displays an area in front of the vehicle 10 with more emphasis than an area behind the vehicle 10.

Figure 23:
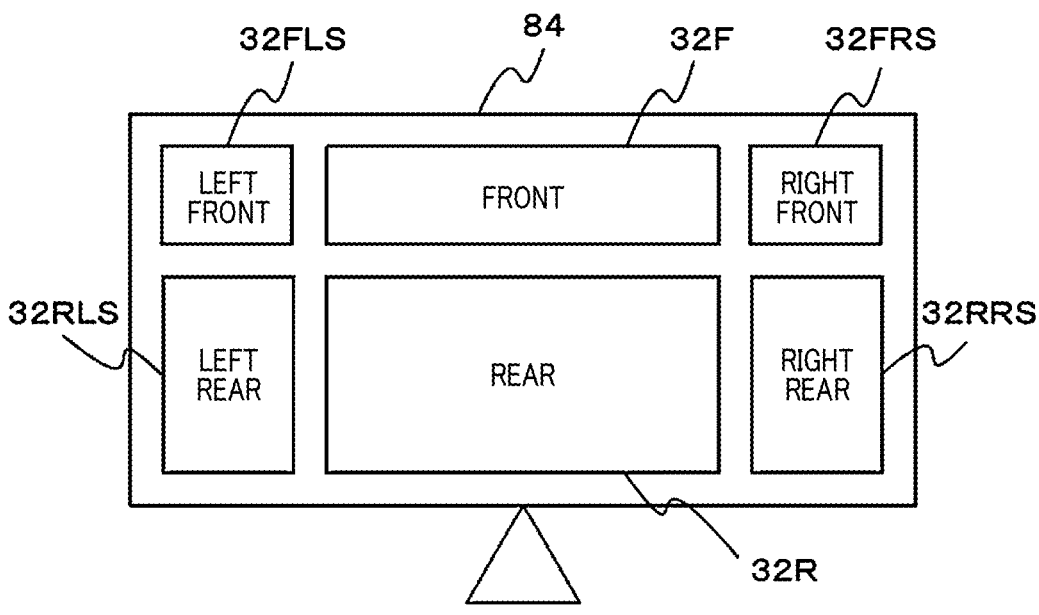
FIG. 23 is a diagram illustrating an example of the display screen of the operator terminal according to the third embodiment.

In addition, in step S116 in FIG. 5, the CPU 60A transmits an image, in which a rear area is emphasized as illustrated in FIG. 23, to the operator terminal 80. In the rear image illustrated in FIG. 23, compared with the front image illustrated in FIG. 22, the display area of the captured image 32R is larger than that of the captured image 32F, the display area of the captured image 32RRS is larger than that of the captured image 32FRS, and the display area of the captured image 32RLS is larger than that of the captured image 32FLS. That is, the display unit 84 displays an area in front of the vehicle 10 with more emphasis than an area behind the vehicle 10.

Fourth Embodiment

The fourth embodiment will be described. It is noted that the same part as those of the above embodiments is denoted by the same reference sign to omit redundant descriptions.

In the fourth embodiment, a modification of a case in which a rear image in which an object missed by an operator is emphasized is transmitted to operator terminal 80 will be described.

Figure 24:
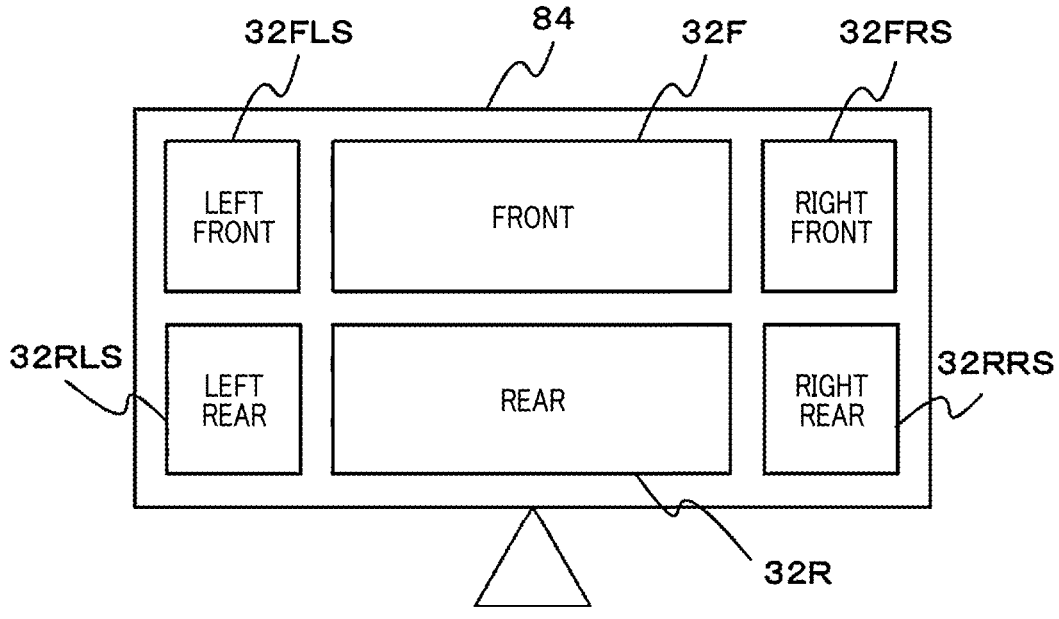
FIG. 24 is a diagram illustrating an example of a display screen of an operator terminal according to a fourth embodiment.

FIG. 24 illustrates an example of a front image transmitted by the CPU 60A to the operator terminal 80 in step S108 in FIG. 5. In the example in FIG. 24, the front image is an image including the captured image 32F obtained by capturing an image of the front area 30F, the captured image 32FRS obtained by capturing an image of the right front area 30FRS, the captured image 32FLS obtained by capturing an image of the left front area 30FLS, the captured image 32R obtained by capturing an image of the rear area 30R, the captured image 32RRS obtained by capturing an image of the right rear area 30RRS, and the captured image 32RLS obtained by capturing an image of the left rear area 30RLS. It is noted that, in the example illustrated in FIG. 24, sizes of the display areas of the captured images 32F, 32R are the same, sizes of the display areas of the captured images 32FRS, 32RRS are the same, and sizes of the display areas of the captured images 32FLS, 32RLS are the same.

Figure 25:
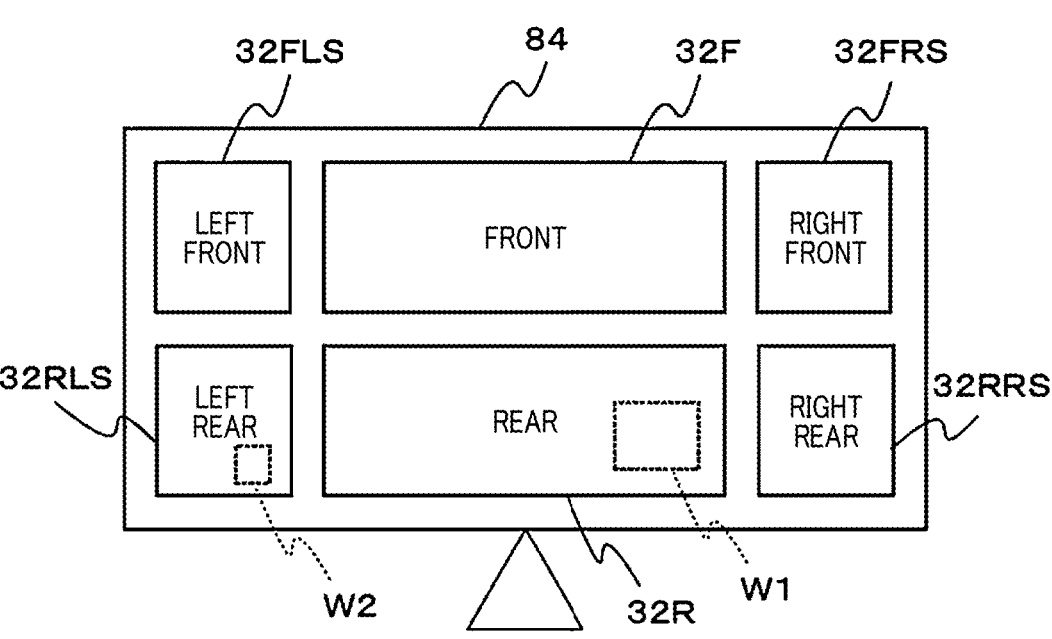
FIG. 25 is a diagram illustrating an example of the display screen of the operator terminal according to the fourth embodiment.

In addition, FIG. 25 illustrates an example of a rear image transmitted by the CPU 60A to the operator terminal 80 in step S116 in FIG. 5. In the example in FIG. 25, the rear image is an image in which objects missed by the operator are surrounded by frames W1, W2 in the front image illustrated in FIG. 24 to emphasize the objects.

The method of extracting an object missed by the operator is similar to that described in the second embodiment. For example, a known object extraction process is performed for the front image and the rear image to extract objects. Out of the objects extracted from the rear image, the objects that are not included in the front image are set as objects missed by the operator. Then, the missed objects are surrounded by the frames W1, W2 to emphasize the objects and the rear image is transmitted to the operator terminal 80. Hence, the operator can easily recognize the object that is likely to have been missed by the operator.

It is noted that the present disclosure is not limited to the above embodiments, and many variations and applications are possible without departing from the spirit of technique of the present disclosure.

For example, in the above embodiments, a case in which an operator operates the operator terminal 80 to remotely control the vehicle 10 has been described. However, the technique of the present disclosure can be also applied to a case in which a remote-control device including a steering wheel, an accelerator pedal, and a brake pedal is controlled to remotely control the vehicle 10

In addition, in the above embodiments, a case in which improving an ability of an operator to determine situations is supported has been described. However, the technique of the present disclosure can be also applied to a case in which improving an ability of a supervisor, supervising the operator, to determine situations is supported. In addition, the technique of the present disclosure can be also applied to a case in which evaluation or improvements of the remote support for the operator provided by the supervisor is fed back to the operator. In addition, the technique of the present disclosure can be also applied to a case in which improving an ability of another operator to determine situations is supported by providing the result of the remote support to the operator. For example, the technique of the present disclosure can be also applied to a case in which an orientation for new employees or adjustment between levels of operators is required to be performed.

In addition, the configuration of the autonomous driving system 100 described in the above embodiments (refer to FIG. 1) is an example. Needless to say, unnecessary parts may be deleted and new parts may be added within a scope not deviating from the gist of the technique of the present disclosure.

In addition, the flow of the processing of the remote support program 76 described in the above embodiments (refer to FIG. 5) is also an example. Needless to say, unnecessary steps may be deleted, new steps may be added, and the sequence of processing may be changed within a scope not deviating from the gist of the technique of the present disclosure.

The device and the processing thereof described in the present disclosure may be implemented by a dedicated computer which is provided by configuring a processor that is programmed to execute one or more functions embodied by a computer program. Alternatively, the device and the processing thereof described in the present disclosure may be implemented by a dedicated computer which is provided by configuring a processor with a dedicated hardware logic circuit. Alternatively, the device and the processing thereof described in the present disclosure may be implemented by one or more dedicated computers which are configured by combining a processor that executes a computer program, with one or more hardware logic circuits. Furthermore, the computer program may be stored in a computer readable non-transitory tangible storage medium, as instructions to be executed by the computer.

The following are additional matters.

ADDITIONAL MATTERS

Additional Matter 1

A remote support device (50), including:
a front image transmission unit (40) that, when remote support at a support point is requested from an autonomous driving vehicle (10), transmits a front image including at least an area in front of the autonomous driving vehicle captured by the autonomous driving vehicle to a remote control device (80) that performs remote control for the autonomous driving vehicle;
a reception unit (42) that receives an operation signal corresponding to the remote control at the support point from the remote control device;

an operation signal transmission unit (44) that transmits the received operation signal to the autonomous driving vehicle; and a rear image transmission unit (46) that, after the autonomous driving vehicle passes through a changing point set so as to change display on the remote control device based on the support point, transmits a rear image that is captured so as to include at least an area behind the autonomous driving vehicle and emphasizes the rear area, to the remote control device.

Additional Matter 2

The remote support device according to additional matter 1, wherein the rear image transmission unit transmits a rear image of an imaging area predetermined depending on contents of the remote control.

Additional Matter 3

The remote support device according to additional matter 1 or 2, wherein the reception unit receives sight line position information concerning a sight line position of an operator of the remote control device in the front image displayed on the remote control device, and the rear image transmission unit transmits a rear image including an observation area of the operator specified based on the sight line position information, to the remote control device.

Additional Matter 4

The remote support device according to additional matter 3, wherein when a plurality of observation areas are present, the rear image transmission unit transmits a rear image including an observation area to the remote control device, an observation time period for the observation area being the longest among the plurality of observation areas.

Additional Matter 5

The remote support device according to additional matter 3, wherein when a plurality of observation areas are present, the rear image transmission unit transmits a rear image including all the plurality of observation areas to the remote control device.

Additional Matter 6

The remote support device according to any of additional matters 1 to 5, wherein the rear image transmission unit transmits a rear image, in which an object missed by an operator of the remote control device is emphasized, to the remote control device.

Additional Matter 7

The remote support device according to any of additional matters 3 to 5, wherein the rear image transmission unit transmits a rear image in which an object missed by the operator, which is specified based on the observation area, is emphasized, to the remote control device.

Additional Matter 8

8. The remote support device according to any of additional matters 1 to 7, wherein the rear image transmission unit transmits a rear image, in which a newly detected object is emphasized, to the remote control device.

Additional Matter 9

The remote support device according to any of additional matters 1 to 8, wherein the rear image transmission unit transmits a rear image, on which speed information regarding change of speed of an oncoming vehicle detected by the autonomous driving vehicle is displayed, to the remote control device.

Additional Matter 10

The remote support device according to any of additional matters 1 to 9, wherein the rear image transmission unit acquires a bird's eye image obtained by capturing an image of an area including the changing point in a bird's eye view and transmits the bird's eye image to the remote control device.

Additional Matter 11

The remote support device according to any of additional matters 1 to 10, wherein the rear image is an image in which a display area displaying the area behind the autonomous driving vehicle is larger than a display area displaying the area in front of the autonomous driving vehicle.

Additional Matter 12

A remote support method performed by at least one processor (60A) that performs a process including:

when remote support at a support point is requested from an autonomous driving vehicle, transmitting a front image including at least an area in front of the autonomous driving vehicle captured by the autonomous driving vehicle to a remote control device that performs remote control for the autonomous driving vehicle;

receiving an operation signal corresponding to the remote control at the support point from the remote control device;

transmitting the received operation signal to the autonomous driving vehicle; and after the autonomous driving vehicle passes through a changing point set so as to change display on the remote control device based on the support point, transmitting a rear image that is captured so as to include at least an area behind the autonomous driving vehicle and emphasizes the rear area, to the remote control device.

Additional Matter 13

A storage medium in which a remote support program (76) is stored to cause at least one processor to perform a process including:

when remote support at a support point is requested from an autonomous driving vehicle, transmitting a front image including at least an area in front of the autonomous driving vehicle captured by the autonomous driving vehicle to a remote control device that performs remote control for the autonomous driving vehicle;

receiving an operation signal corresponding to the remote control at the support point from the remote control device;

transmitting the received operation signal to the autonomous driving vehicle; and after the autonomous driving vehicle passes through a changing point set so as to change display on the remote control device based on the support point, transmitting a rear image that is captured so as to include at least an area behind the autonomous driving vehicle and emphasizes the rear area, to the remote control device.

A remote support device of a first aspect of the present disclosure includes a front image transmission unit that, when remote support at a support point is requested from an autonomous driving vehicle, transmits a front image including at least an area in front of the autonomous driving vehicle captured by the autonomous driving vehicle to a remote control device that performs remote control for the autonomous driving vehicle; a reception unit that receives an operation signal corresponding to the remote control at the support point from the remote control device; an operation signal transmission unit that transmits the received operation signal to the autonomous driving vehicle; and a rear image transmission unit that, after the autonomous driving vehicle passes through a changing point set so as to change display on the remote control device based on the support point, transmits a rear image that is captured so as to include at least an area behind the autonomous driving vehicle and emphasizes the rear area, to the remote control device.

In a remote support device of a second aspect according to the first aspect, the rear image transmission unit transmits a rear image of an imaging area predetermined depending on contents of the remote control.

In a remote support device of a third aspect according to the first aspect or the second aspect, the reception unit receives sight line position information concerning a sight line position of an operator of the remote control device in the front image displayed on the remote control device, and the rear image transmission unit transmits a rear image including an observation area of the operator specified based on the sight line position information, to the remote control device.

In a remote support device of a fourth aspect according to the third aspect, when a plurality of observation areas are present, the rear image transmission unit transmits a rear image including an observation area to the remote control device, an observation time period for the observation area being the longest among the plurality of observation areas.

In a remote support device of a fifth aspect according to the third aspect, when a plurality of observation areas are present, the rear image transmission unit transmits a rear image including all the plurality of observation areas to the remote control device.

In a remote support device of a sixth aspect according to any of the first to fifth aspects, the rear image transmission unit transmits a rear image, in which an object missed by an operator of the remote control device is emphasized, to the remote control device.

In a remote support device of a seventh aspect according to any of the third to fifth aspects, the rear image transmission unit transmits a rear image in which an object missed by the operator, which is specified based on the observation area, is emphasized, to the remote control device.

In a remote support device of an eighth aspect according to the first aspect, the rear image transmission unit transmits a rear image, in which a newly detected object is emphasized, to the remote control device.

In a remote support device of a ninth aspect according to the first aspect, the rear image transmission unit transmits a rear image, on which speed information regarding change of speed of an oncoming vehicle detected by the autonomous driving vehicle is displayed, to the remote control device.

In a remote support device of a tenth aspect according to the first aspect, the rear image transmission unit acquires a bird's eye image obtained by capturing an image of an area including the changing point in a bird's eye view and transmits the bird's eye image to the remote control device.

In a remote support device of an eleventh aspect according to the first aspect, the rear image is an image in which a display area displaying the area behind the autonomous driving vehicle is larger than a display area displaying the area in front of the autonomous driving vehicle.

A remote support method of a twelfth aspect is performed by at least one processor that performs a process including: when remote support at a support point is requested from an autonomous driving vehicle, transmitting a front image including at least an area in front of the autonomous driving vehicle captured by the autonomous driving vehicle to a remote control device that performs remote control for the autonomous driving vehicle; receiving an operation signal corresponding to the remote control at the support point from the remote control device; transmitting the received operation signal to the autonomous driving vehicle; and after the autonomous driving vehicle passes through a changing point set so as to change display on the remote control device based on the support point, transmitting a rear image that is captured so as to include at least an area behind the autonomous driving vehicle and emphasizes the rear area, to the remote control device.

A storage medium in which a remote support program is stored to cause at least one processor to perform a process including: when remote support at a support point is requested from an autonomous driving vehicle, transmitting a front image including at least an area in front of the autonomous driving vehicle captured by the autonomous driving vehicle to a remote control device that performs remote control for the autonomous driving vehicle; receiving an operation signal corresponding to the remote control at the support point from the remote control device; transmitting the received operation signal to the autonomous driving vehicle; and after the autonomous driving vehicle passes through a changing point set so as to change display on the remote control device based on the support point, transmitting a rear image that is captured so as to include at least an area behind the autonomous driving vehicle and emphasizes the rear area, to the remote control device.

According to the present disclosure, improvement in an ability of staff, who participate in remote control for supporting travel of autonomous driving vehicles, to determine situations can be supported.

What is claimed is:

1. A remote support device, comprising:
   a front image transmission unit that, when remote support at a support point is requested from an autonomous driving vehicle, transmits a front image including at least an area in front of the autonomous driving vehicle captured by the autonomous driving vehicle to a remote control device that performs remote control for the autonomous driving vehicle;

a reception unit that receives an operation signal corresponding to the remote control at the support point from the remote control device;

an operation signal transmission unit that transmits the received operation signal to the autonomous driving vehicle; and a rear image transmission unit that, after the autonomous driving vehicle passes through a changing point set so as to change display on the remote control device based on the support point, transmits a rear image that is captured so as to include at least an area behind the autonomous driving vehicle and emphasizes the rear area, to the remote control device.

2. The remote support device according to claim 1, wherein the rear image transmission unit transmits a rear image of an imaging area predetermined depending on contents of the remote control.

3. The remote support device according to claim 1, wherein the rear image transmission unit transmits a rear image, in which an object missed by an operator of the remote control device is emphasized, to the remote control device.

4. The remote support device according to claim 1, wherein the rear image transmission unit transmits a rear image, in which a newly detected object is emphasized, to the remote control device.

5. The remote support device according to claim 1, wherein the rear image transmission unit transmits a rear image, on which speed information regarding change of speed of an oncoming vehicle detected by the autonomous driving vehicle is displayed, to the remote control device.

6. The remote support device according to claim 1, wherein the rear image transmission unit acquires a bird's eye image obtained by capturing an image of an area including the changing point in a bird's eye view and transmits the bird's eye image to the remote control device.

7. The remote support device according to claim 1, wherein the rear image is an image in which a display area displaying the area behind the autonomous driving vehicle is larger than a display area displaying the area in front of the autonomous driving vehicle.

8. The remote support device according to claim 1, wherein the reception unit receives sight line position information concerning a sight line position of an operator of the remote control device in the front image displayed on the remote control device, and the rear image transmission unit transmits a rear image including an observation area of the operator specified based on the sight line position information, to the remote control device.

9. The remote support device according to claim 8, wherein when a plurality of observation areas are present, the rear image transmission unit transmits a rear image including an observation area to the remote control device, an observation time period for the observation area being the longest among the plurality of observation areas.

10. The remote support device according to claim 8, wherein when a plurality of observation areas are present, the rear image transmission unit transmits a rear image including all the plurality of observation areas to the remote control device.

11. The remote support device according to claim 8, wherein the rear image transmission unit transmits a rear image in which an object missed by the operator, which is specified based on the observation area, is emphasized, to the remote control device.

12. A remote support method performed by at least one processor that performs a process including:

when remote support at a support point is requested from an autonomous driving vehicle, transmitting a front image including at least an area in front of the autonomous driving vehicle captured by the autonomous driving vehicle to a remote control device that performs remote control for the autonomous driving vehicle;

receiving an operation signal corresponding to the remote control at the support point from the remote control device;

transmitting the received operation signal to the autonomous driving vehicle; and after the autonomous driving vehicle passes through a changing point set so as to change display on the remote control device based on the support point, transmitting a rear image that is captured so as to include at least an area behind the autonomous driving vehicle and emphasizes the rear area, to the remote control device.

13. A storage medium in which a remote support program is stored to cause at least one processor to perform a process including:

when remote support at a support point is requested from an autonomous driving vehicle, transmitting a front image including at least an area in front of the autonomous driving vehicle captured by the autonomous driving vehicle to a remote control device that performs remote control for the autonomous driving vehicle;

receiving an operation signal corresponding to the remote control at the support point from the remote control device;

transmitting the received operation signal to the autonomous driving vehicle; and after the autonomous driving vehicle passes through a changing point set so as to change display on the remote control device based on the support point, transmitting a rear image that is captured so as to include at least an area behind the autonomous driving vehicle and emphasizes the rear area, to the remote control device.

* * * * *